(12) United States Patent
Lee

(10) Patent No.: US 11,445,179 B2
(45) Date of Patent: *Sep. 13, 2022

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,076

(22) Filed: Dec. 17, 2020

(65) Prior Publication Data

US 2021/0105461 A1 Apr. 8, 2021

Related U.S. Application Data

(60) Continuation of application No. 16/908,197, filed on Jun. 22, 2020, which is a division of application No.
(Continued)

(30) Foreign Application Priority Data

| Jun. 24, 2016 | (KR) | 10-2016-0079641 |
| Jun. 24, 2016 | (KR) | 10-2016-0079642 |
| Jun. 24, 2016 | (KR) | 10-2016-0079644 |

(51) Int. Cl.
*H04N 19/124* (2014.01)
*H04N 19/96* (2014.01)
(Continued)

(52) U.S. Cl.
CPC .......... *H04N 19/105* (2014.11); *H04N 19/10* (2014.11); *H04N 19/107* (2014.11);
(Continued)

(58) Field of Classification Search
CPC .. H04N 19/124; H04N 19/174; H04N 19/119; H04N 19/196; H04N 19/44
See application file for complete search history.

(56) References Cited

U.S. PATENT DOCUMENTS 9,258,573 B2  2/2016  Drugeon et al.
2010/0027655 A1  2/2010  Matsuo et al.
(Continued)

FOREIGN PATENT DOCUMENTS

CN  101682774 A  3/2010
CN  103621079 A  3/2014
(Continued)

OTHER PUBLICATIONS

Jani Lainema et al., "Intra Coding of the HEVC Standard", IEEE Transactions on Circuits and Systems for Video Technology, Dec. 2012, vol. 22, No. 12, pp. 1792-1801.
(Continued)

*Primary Examiner* — Nam D Pham
(74) *Attorney, Agent, or Firm* — IP Legal Services, LLC

(57) ABSTRACT

A method for decoding a video according to the present invention may comprise: deriving a plurality of reference sample lines for a current block, selecting at least one among the plurality of reference sample lines, determining whether to apply an intra filter to a reference sample included in the selected reference sample line, selectively applying the intra filter to the reference sample according to the determination, and performing intra prediction for the current block using the reference sample.

7 Claims, 18 Drawing Sheets

Related U.S. Application Data

16/311,582, filed as application No. PCT/KR2017/006609 on Jun. 22, 2017, now Pat. No. 10,735,720.

(51) Int. Cl.

| | |
|---|---|
| *H04N 19/60* | (2014.01) |
| *H04N 19/103* | (2014.01) |
| *H04N 19/44* | (2014.01) |
| *H04N 19/196* | (2014.01) |
| *H04N 19/119* | (2014.01) |
| *H04N 19/174* | (2014.01) |
| *H04N 19/13* | (2014.01) |
| *H04N 19/159* | (2014.01) |
| *H04N 19/176* | (2014.01) |
| *H04N 19/105* | (2014.01) |
| *H04N 19/107* | (2014.01) |
| *H04N 19/70* | (2014.01) |
| *H04N 19/182* | (2014.01) |
| *H04N 19/10* | (2014.01) |

(52) U.S. Cl.
CPC ......... *H04N 19/119* (2014.11); *H04N 19/159* (2014.11); *H04N 19/176* (2014.11); *H04N 19/182* (2014.11); *H04N 19/44* (2014.11); *H04N 19/70* (2014.11)

(56) References Cited

U.S. PATENT DOCUMENTS

| | | | |
|---|---|---|---|
| 2012/0140821 A1 | 6/2012 | Drugeon et al. | |
| 2013/0016774 A1 | 1/2013 | Oh | |
| 2013/0215960 A1 | 8/2013 | Song et al. | |
| 2014/0056352 A1 | 2/2014 | Park et al. | |
| 2014/0133559 A1 | 5/2014 | Kim et al. | |
| 2015/0229965 A1 | 8/2015 | Park et al. | |
| 2015/0264406 A1 | 9/2015 | Kim et al. | |
| 2016/0057421 A1 | 2/2016 | Oh et al. | |
| 2016/0057422 A1 | 2/2016 | Oh et al. | |
| 2016/0057423 A1 | 2/2016 | Oh et al. | |
| 2016/0057424 A1 | 2/2016 | Oh et al. | |
| 2016/0057425 A1 | 2/2016 | Oh et al. | |
| 2016/0057426 A1 | 2/2016 | Oh et al. | |
| 2016/0057427 A1 | 2/2016 | Oh et al. | |
| 2016/0057449 A1 | 2/2016 | Oh et al. | |
| 2016/0057450 A1 | 2/2016 | Oh et al. | |
| 2016/0080745 A1 | 3/2016 | Kwak et al. | |
| 2016/0134866 A1 | 5/2016 | Budagavi | |
| 2016/0219290 A1* | 7/2016 | Zhao ................ | H04N 19/159 |
| 2019/0141318 A1 | 5/2019 | Li et al. | |
| 2020/0228835 A1 | 7/2020 | Park et al. | |
| 2021/0112274 A1 | 4/2021 | Park et al. | |

FOREIGN PATENT DOCUMENTS

| | | |
|---|---|---|
| EP | 2129135 A1 | 12/2009 |
| EP | 2600613 A2 | 6/2013 |
| EP | 2704435 A2 | 3/2014 |
| EP | 2600613 A4 | 9/2014 |
| EP | 3059961 A1 | 8/2016 |
| KR | 10-2009-0110336 A | 10/2009 |
| KR | 10-2013-0005233 A | 1/2013 |
| KR | 10-2015-0038688 A | 4/2015 |
| WO | 2012/011714 A2 | 1/2012 |
| WO | 2012/148138 A2 | 11/2012 |
| WO | 2014/107073 A1 | 7/2014 |
| WO | 2014/178563 A1 | 11/2014 |

OTHER PUBLICATIONS

E. Alshina et al., "Description of Exploration Experiments on Coding Tools", Document: JVET-C1011, Joint Video Exploration Team (JVET) of ITU-T SG 16 WP 3 and ISO/IEC JTC 1/SC 29/WG 11, 3rd Meeting: Geneva, CH, May 26-31, 2016.

Jianle Chen et al., "Algorithm Description of Joint Exploration Test Model 2", Document: JVET-B1001_v3, Joint Video Exploration Team (JVET) of ITU-T SG 16 WP 3 and ISO/IEC JTC 1/SC 29/WG 11, 2nd Meeting: San Diego, USA, Feb. 20-26, 2016.

Yao-Jen Chang et al., "Arbitrary reference tier for intra directional modes", Document: JVET-C0043r1, Joint Video Exploration Team (JVET) of ITU-T SG 16 WP 3 and ISO/IEC JTC 1/SC 29/WG 11, 3rd Meeting: Geneva, CH, May 26-Jun. 1, 2016.

Jiahao Li et al., "Multiple line-based intra prediction", Document: JVET-C0071, Joint Video Exploration Team (JVET) of ITU-T SG 16 WP 3 and ISO/IEC JTC 1/SC 29/WG 11 3rd Meeting: Geneva, CH, May 26-Jun. 1, 2016.

Vivienne Sze et al., "High Efficiency Video Coding (HEVC)", Algorithms and Architectures, Springer International Publishing, Switzerland, 2014.

Jianle Chen et al., "Algorithm Description of Joint Exploration Test Model 2", Document: JVET-B1001_v1, Joint Video Exploration Team (JVET) of ITU-T SG 16 WP 3 and ISO/IEC JTC 1/SC 29/WG 11, 2nd Meeting: San Diego, USA, Feb. 20-26, 2016.

European Patent Office, European Search Report of corresponding EP Patent Application No. 17815739.2, dated Jan. 22, 2020.

State Intellectual Property Office of People's Republic of China, Office Action of corresponding CN Patent Application No. 201780039262.0, dated Dec. 2, 2020.

\* cited by examiner

FIG. 5
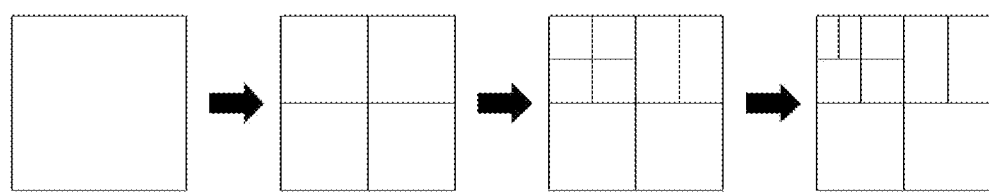
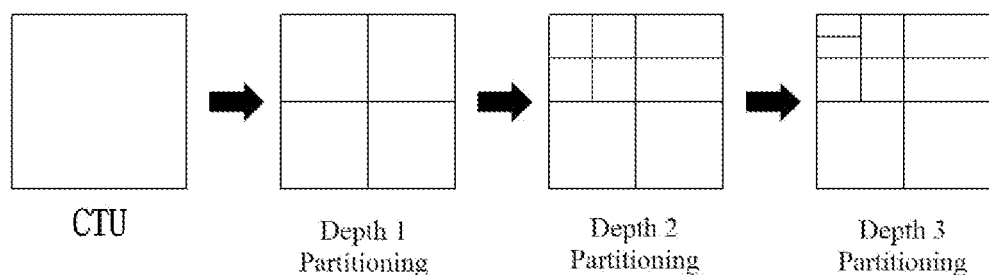
FIG. 6
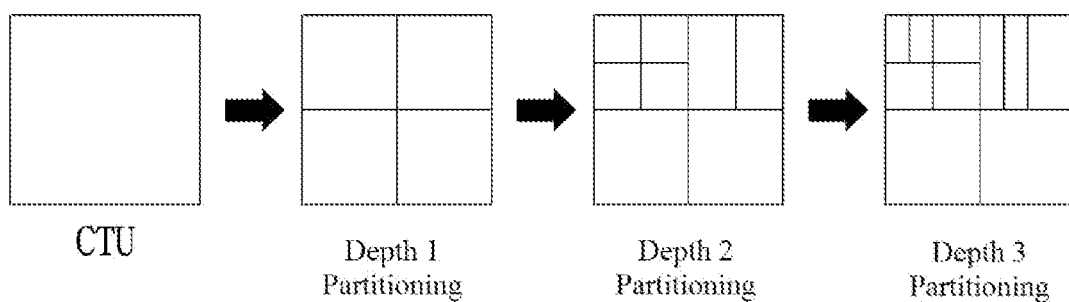

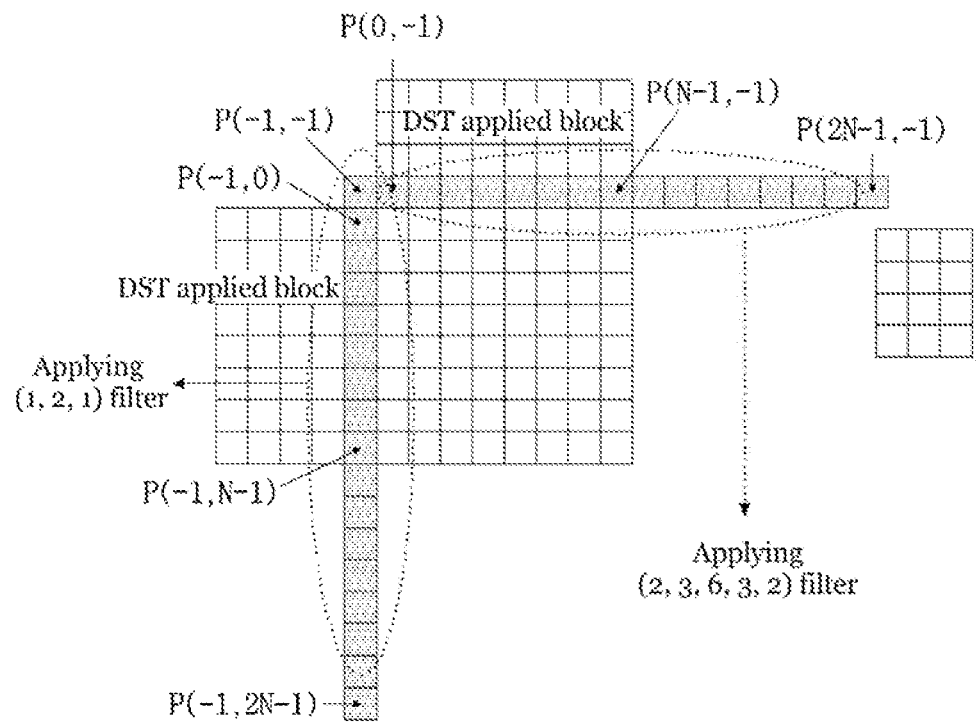

METHOD AND APPARATUS FOR PROCESSING VIDEO SIGNAL

CROSS REFERENCE TO RELATED APPLICATIONS

This application is a Continuation of U.S. patent application Ser. No. 16/908,197 (filed on Jun. 22, 2020), which is a Divisional of U.S. patent application Ser. No. 16/311,582 (filed on Dec. 19, 2018), now issued as U.S. Pat. No. 10,735,720, which is a National Stage Patent Application of PCT International Patent Application No. PCT/KR2017/006609 (filed on Jun. 22, 2017) under 35 U.S.C. § 371, which claims priority to Korean Patent Application Nos. 10-2016-0079641 (filed on Jun. 24, 2016), 10-2016-0079642 (filed on Jun. 24, 2016) and 10-2016-0079644 (filed on Jun. 24, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is intended to provide a method and an apparatus for efficiently performing intra-prediction for an encoding/decoding target block in encoding/decoding a video signal.

An object of the present invention is intended to provide a method and an apparatus for performing intra prediction for an encoding/decoding target block based on a plurality of reference lines.

An object of the present invention is intended to provide a method and an apparatus to apply an intra filter to at least one of a plurality of reference lines.

An object of the present invention is intended to provide a method and an apparatus to adaptively determine an intra prediction mode or a number of the intra prediction mode according to a reference line used for intra prediction of a current block.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may derive a plurality of reference sample lines for a current block, select at least one among the plurality of reference sample lines, determine whether to apply an intra filter to a reference sample included in the selected reference sample line, selectively apply the intra filter to the reference sample according to the determination, and perform intra prediction for the current block using the reference sample.

A method and an apparatus for encoding a video signal according to the present invention may derive a plurality of reference sample lines for a current block, select at least one among the plurality of reference sample lines, determine whether to apply an intra filter to a reference sample included in the selected reference sample line, selectively apply the intra filter to the reference sample according to the determination, and perform intra prediction for the current block using the reference sample.

In the method and the apparatus for encoding/decoding a video signal according to the present invention, whether to apply the intra filter is determined based on a size of the current block, an intra prediction mode of the current block or a position of the selected reference sample.

In the method and the apparatus for encoding/decoding a video signal according to the present invention, a type of the intra filter is determined based on a size of the current block, an intra prediction mode of the current block or a position of the selected reference sample.

In the method and the apparatus for encoding/decoding a video signal according to the present invention, wherein the plurality of reference sample lines are classified into a plurality of groups, and a type of the intra filter is determined according to a group in which the selected reference sample line is included.

In the method and the apparatus for encoding/decoding a video signal according to the present invention, a number of intra prediction modes available for the current block is adaptively determined based on a position of the selected reference sample line.

In the method and the apparatus for encoding/decoding a video signal according to the present invention, whether the current block is available to use a non-direction intra prediction mode is determined based on a position of the selected reference sample line.

In the method and the apparatus for encoding/decoding a video signal according to the present invention, selecting at least one among the plurality of reference sample lines is performed based on an intra prediction mode of the current block or a number of intra prediction mode available for the current block.

The features briefly summarized above for the present invention are only illustrative aspects of the detailed description of the invention that follows, but do not limit the scope of the invention.

Advantageous Effects

According to the present invention, an efficient intra-prediction may be performed for an encoding/decoding target block.

According to the present invention, intra prediction for an encoding/decoding target block may be performed based on a plurality of reference lines.

According to the present invention, an intra filter may be applied to at least one of a plurality of reference lines.

According to the present invention, an intra prediction mode or a number of the intra prediction mode may be adaptively determined according to a reference line used for intra prediction of a current block.

The effects obtainable by the present invention are not limited to the above-mentioned effects, and other effects not mentioned can be clearly understood by those skilled in the art from the description below.

DESCRIPTION OF DRAWINGS

FIG. 5 is a diagram illustrating an example in which only a binary tree-based partition of a pre-determined type is allowed according to an embodiment of the present invention.

FIG. 6 is a diagram for explaining an example in which information related to the allowable number of binary tree partitioning is encoded/decoded, according to an embodiment to which the present invention is applied.

FIGS. 15 to 17 illustrate an example of filtering on reference samples according to an embodiment of the present invention.

FIGS. 25 and 26 are diagrams illustrating reference samples used to derive an average value of a reference line according to an embodiment to which the present invention is applied.

MODE FOR INVENTION

Figure 1:
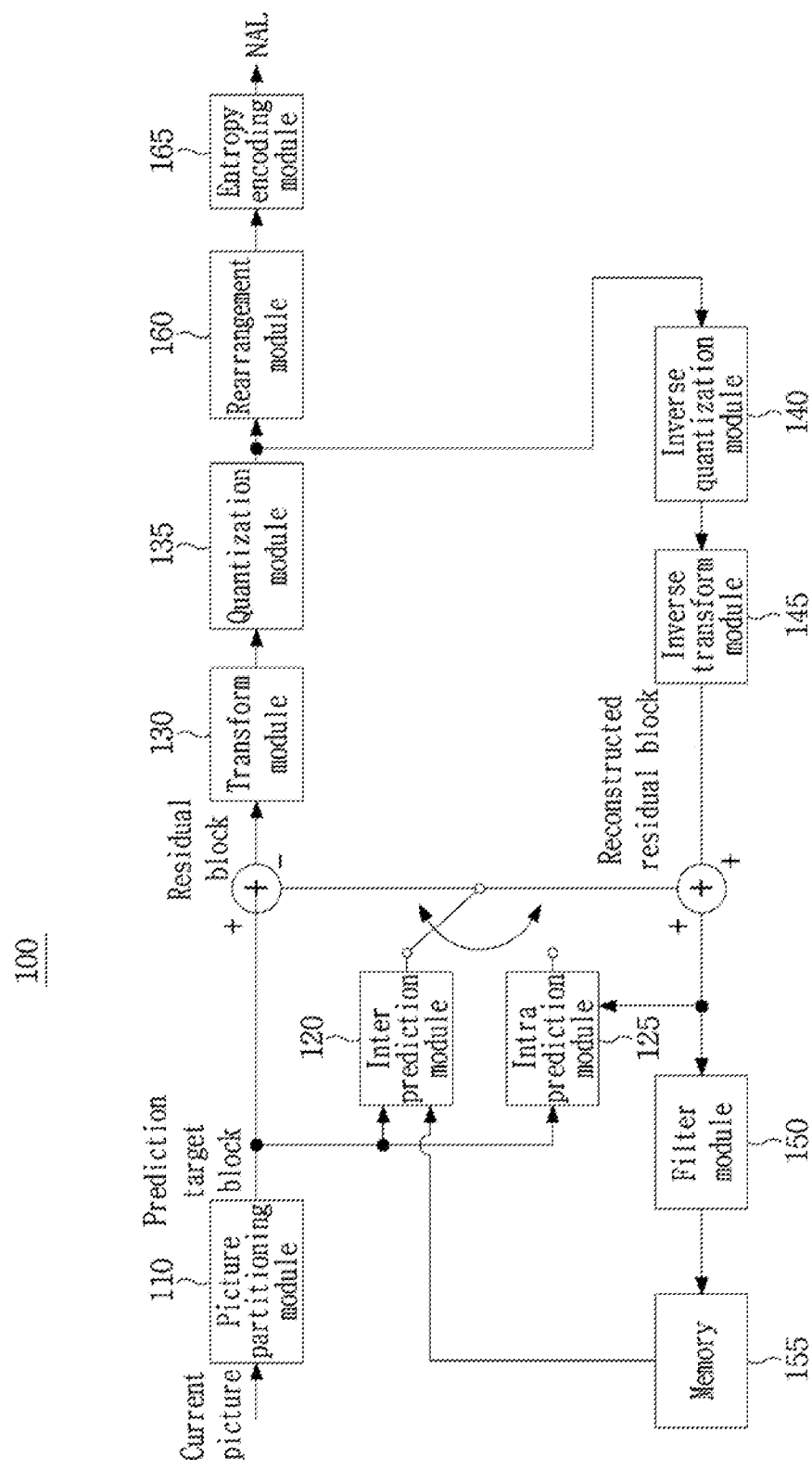
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
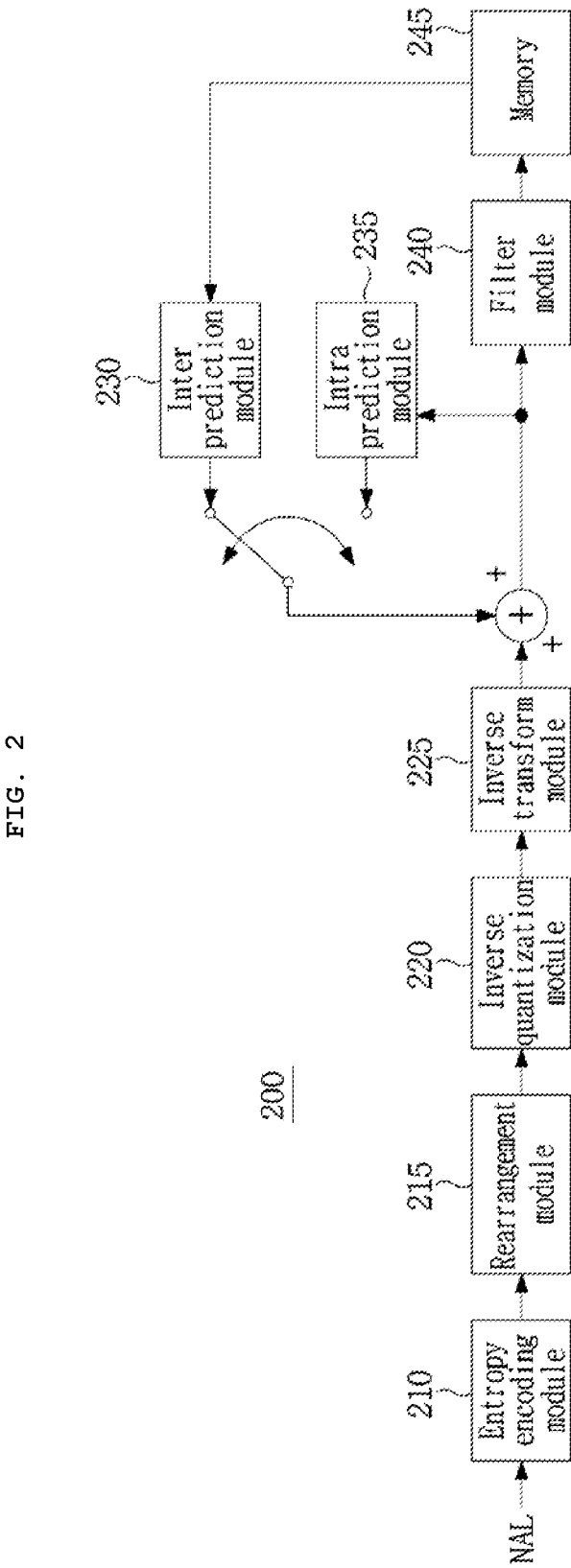
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line and a horizontal line. In addition, the number of vertical lines or horizontal lines partitioning the coding tree unit or the coding unit may be at least one or more. For example, the coding tree unit or the coding unit may be divided into two partitions using one vertical line or one horizontal line, or the coding tree unit or the coding unit may be divided into three partitions using two vertical lines or two horizontal lines. Alternatively, the coding tree unit or the coding unit may be partitioned into four partitions having a height and a width of ½ by using one vertical line and one horizontal line.

When a coding tree unit or a coding unit is divided into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is divided into a quad tree structure or a binary tree structure. However, it is also possible to divide a coding tree unit or a coding unit using a larger number of vertical lines or a larger number of horizontal lines.

Figure 3:
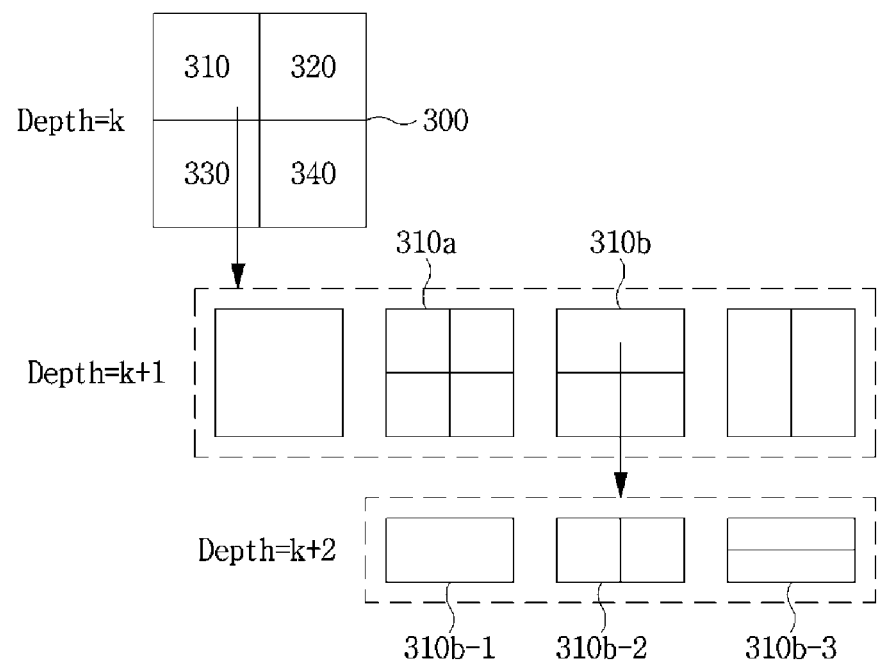
FIG. 3 is a diagram illustrating an example of hierarchically partitioning a coding block based on a tree structure according to an embodiment of the present invention.

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of a upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

FIG. 5 is a diagram illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in units of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus1+1 may indicate the maximum depth at which the binary tree partitioning is allowed.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in units of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

A coding block is encoded using at least one of a skip mode, intra prediction, inter prediction, or a skip method. Once a coding block is determined, a prediction block may be determined through predictive partitioning of the coding block. The predictive partitioning of the coding block may be performed by a partition mode (Part_mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
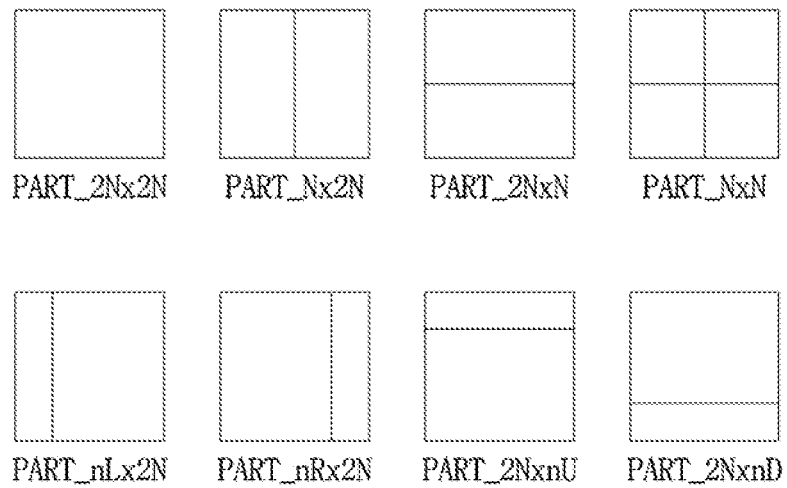
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

Figure 4:
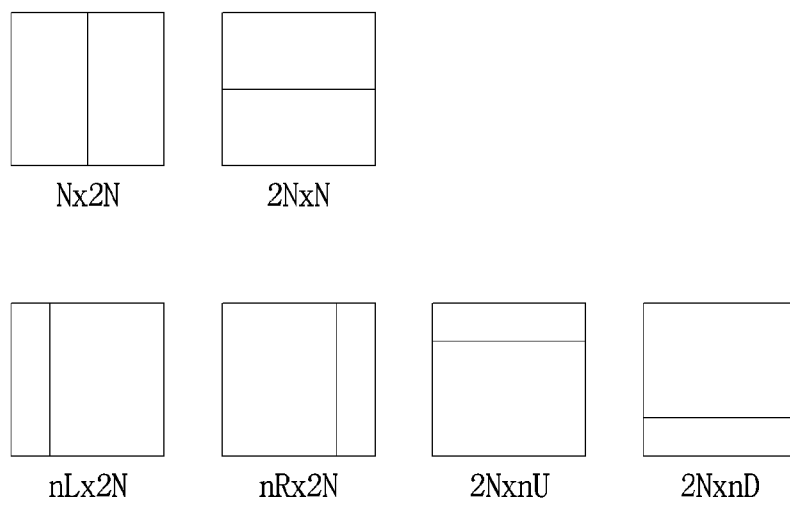
FIG. 4 is a diagram illustrating a partition type in which binary tree-based partitioning is allowed according to an embodiment of the present invention.

When a coding block is encoded by inter prediction, one of 8 partitioning modes may be applied to the coding block, as in the example shown in FIG. 4.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
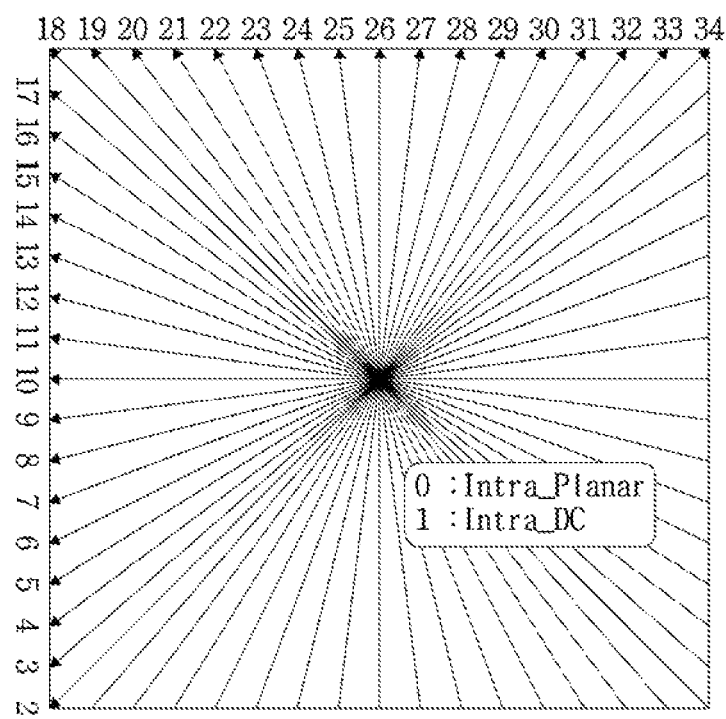
FIG. 8 is a diagram illustrating types of pre-defined intra prediction modes for a device for encoding/decoding a video according to an embodiment of the present invention.

FIG. 8 is a diagram illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction modes may be used. That is, M extended directional prediction modes may be defined by subdividing angles of the directional prediction modes (M>33), and a directional prediction mode having a predetermined angle may be derived using at least one of the 33 pre-defined directional prediction modes.

A larger number of intra prediction modes than 35 intra prediction modes shown in FIG. 8 may be used. For example, a larger number of intra prediction modes than the 35 intra prediction modes can be used by subdividing angles of directional prediction modes or by deriving a directional prediction mode having a predetermined angle using at least one of a pre-defined number of directional prediction modes. At this time, the use of a larger number of intra prediction modes than the 35 intra prediction modes may be referred to as an extended intra prediction mode.

Figure 9:
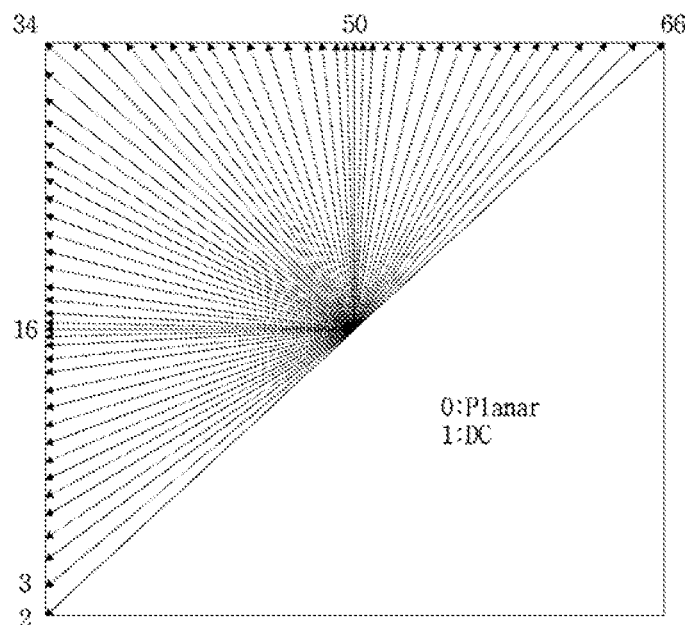
FIG. 9 is a diagram illustrating a kind of extended intra prediction modes according to an embodiment of the present invention.

FIG. 9 shows an example of extended intra prediction modes, and the extended intra prediction modes may include two non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on the size and/or shape of the block, a different number of intra prediction modes may be used to perform intra prediction. That is, depending on the size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra_2N×2N, and only 35 directional intra prediction modes may be allowed for Intra_N×N.

A size of a block to which the extended intra prediction mode is applied may be set differently for each sequence, picture or slice. For example, it is set that the extended intra prediction mode is applied to a block (e.g., CU or PU) which has a size greater than 64×64 in the first slice. On the other hands, it is set that the extended intra prediction mode is applied to a block which has a size greater than 32×32 in the second slice. Information representing a size of a block to which the extended intra prediction mode is applied may be signaled through in units of a sequence, a picture, or a slice. For example, the information indicating the size of the block to which the extended intra prediction mode is applied may be defined as 'log 2_extended_intra_mode_size_minus4' obtained by taking a logarithm of the block size and then subtracting the integer 4. For example, if a value of log 2_extended_intra_mode_size_minus4 is 0, it may indicate that the extended intra prediction mode may be applied to a block having a size equal to or greater than 16×16. And if a value of log 2_extended_intra_mode_size_minus4 is 1, it may indicate that the extended intra prediction mode may be applied to a block having a size equal to or greater than 32×32.

As described above, the number of intra prediction modes may be determined in consideration of at least one of a color component, a chroma format, and a size or a shape of a block. In addition, the number of intra prediction mode candidates (e.g., the number of MPMs) used for determining an intra prediction mode of a current block to be encoded/decoded may also be determined according to at least one of a color component, a color format, and the size or a shape of a block. A method of determining an intra prediction mode of a current block to be encoded/decoded and a method of performing intra prediction using the determined intra prediction mode will be described with the drawings.

Figure 10:
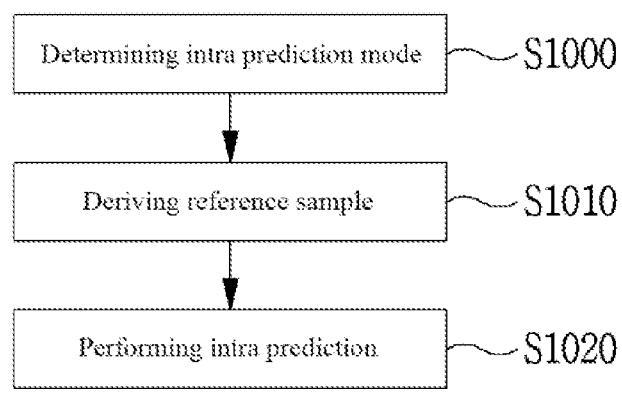
FIG. 10 is a flowchart briefly illustrating an intra prediction method according to an embodiment of the present invention.

FIG. 10 is a flowchart briefly illustrating an intra prediction method according to an embodiment of the present invention.

Referring to FIG. 10, an intra prediction mode of the current block may be determined at step S1000.

Specifically, the intra prediction mode of the current block may be derived based on a candidate list and an index. Here, the candidate list contains multiple candidates, and the multiple candidates may be determined based on an intra prediction mode of the neighboring block adjacent to the current block. The neighboring block may include at least one of blocks positioned at the top, the bottom, the left, the right, and the corner of the current block. The index may specify one of the multiple candidates of the candidate list. The candidate specified by the index may be set to the intra prediction mode of the current block.

An intra prediction mode used for intra prediction in the neighboring block may be set as a candidate. Also, an intra prediction mode having directionality similar to that of the intra prediction mode of the neighboring block may be set as a candidate. Here, the intra prediction mode having similar directionality may be determined by adding or subtracting a predetermined constant value to or from the intra prediction mode of the neighboring block. The predetermined constant value may be an integer, such as one, two, or more.

The candidate list may further include a default mode. The default mode may include at least one of a planar mode, a DC mode, a vertical mode, and a horizontal mode. The default mode may be adaptively added considering the maximum number of candidates that can be included in the candidate list of the current block.

The maximum number of candidates that can be included in the candidate list may be three, four, five, six, or more. The maximum number of candidates that can be included in the candidate list may be a fixed value preset in the device for encoding/decoding a video, or may be variably determined based on a characteristic of the current block. The characteristic may mean the location/size/shape of the block, the number/type of intra prediction modes that the block can use, a color type, a color format, etc. Alternatively, information indicating the maximum number of candidates that can be included in the candidate list may be signaled separately, and the maximum number of candidates that can be included in the candidate list may be variably determined using the information. The information indicating the maximum number of candidates may be signaled in at least one of a sequence level, a picture level, a slice level, and a block level.

When the extended intra prediction modes and the 35 pre-defined intra prediction modes are selectively used, the intra prediction modes of the neighboring blocks may be transformed into indexes corresponding to the extended intra prediction modes, or into indexes corresponding to the 35 intra prediction modes, whereby candidates can be derived. For transform to an index, a pre-defined table may be used, or a scaling operation based on a predetermined value may be used. Here, the pre-defined table may define a mapping relation between different intra prediction mode groups (e.g., extended intra prediction modes and 35 intra prediction modes).

For example, when the left neighboring block uses the 35 intra prediction modes and the intra prediction mode of the left neighboring block is 10 (a horizontal mode), it may be transformed into an index of 16 corresponding to a horizontal mode in the extended intra prediction modes.

Alternatively, when the top neighboring block uses the extended intra prediction modes and the intra prediction mode the top neighboring block has an index of 50 (a vertical mode), it may be transformed into an index of 26 corresponding to a vertical mode in the 35 intra prediction modes.

Based on the above-described method of determining the intra prediction mode, the intra prediction mode may be derived independently for each of the luma component and the chroma component, or the intra prediction mode of the chroma component may be derived depending on the intra prediction mode of the luma component.

Specifically, the intra prediction mode of the chroma component may be determined based on the intra prediction mode of the luma component as shown in the following Table 1.

TABLE 1

| Intra_chroma_pred_mode[xCb][yCb] | IntraPredModeY[xCb][yCb] | | | | |
|---|---|---|---|---|---|
| | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component.

Referring to FIG. 10, a reference sample for intra prediction of the current block may be derived at step S1010.

Specifically, a reference sample for intra prediction may be derived based on a neighboring sample of the current block. The neighboring sample may be a reconstructed sample of the neighboring block, and the reconstructed sample may be a reconstructed sample before an in-loop filter is applied or a reconstructed sample after the in-loop filter is applied.

A neighboring sample reconstructed before the current block may be used as the reference sample, and a neighboring sample filtered based on a predetermined intra filter may be used as the reference sample. Filtering of neighboring samples using an intra filter may also be referred to as reference sample smoothing. The intra filter may include at least one of the first intra filter applied to multiple neighboring samples positioned on the same horizontal line and the second intra filter applied to multiple neighboring samples positioned on the same vertical line. Depending on the positions of the neighboring samples, one of the first intra filter and the second intra filter may be selectively applied, or both intra filters may be applied. At this time, at least one filter coefficient of the first intra filter or the second intra filter may be (1, 2, 1), but is not limited thereto.

Filtering may be adaptively performed based on at least one of the intra prediction mode of the current block and the size of the transform block for the current block. For example, when the intra prediction mode of the current block is the DC mode, the vertical mode, or the horizontal mode, filtering may not be performed. When the size of the transform block is N×M, filtering may not be performed. Here, N and M may be the same values or different values, or may be values of 4, 8, 16, or more. For example, if the size of the transform block is 4×4, filtering may not be performed. Alternatively, filtering may be selectively performed based on the result of a comparison of a pre-defined threshold and the difference between the intra prediction mode of the current block and the vertical mode (or the horizontal mode). For example, when the difference between the intra prediction mode of the current block and the vertical mode is greater than a threshold, filtering may be performed. The threshold may be defined for each size of the transform block as shown in Table 2.

TABLE 2

| | 8 × 8 transform | 16 × 16 transform | 32 × 32 transform |
|---|---|---|---|
| Threshold | 7 | 1 | 0 |

The intra filter may be determined as one of multiple intra filter candidates pre-defined in the device for encoding/decoding a video. To this end, an index specifying an intra filter of the current block among the multiple intra filter candidates may be signaled. Alternatively, the intra filter may be determined based on at least one of the size/shape of the current block, the size/shape of the transform block, information on the filter strength, and variations of the neighboring samples.

Referring to FIG. 10, intra prediction may be performed using the intra prediction mode of the current block and the reference sample at step S1020.

That is, the prediction sample of the current block may be obtained using the intra prediction mode determined at step S500 and the reference sample derived at step S510. However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIGS. 11 to 13. However, the correction process is not limited to being applied only to the intra prediction sample, and may be applied to an inter prediction sample or the reconstructed sample.

Figure 11:
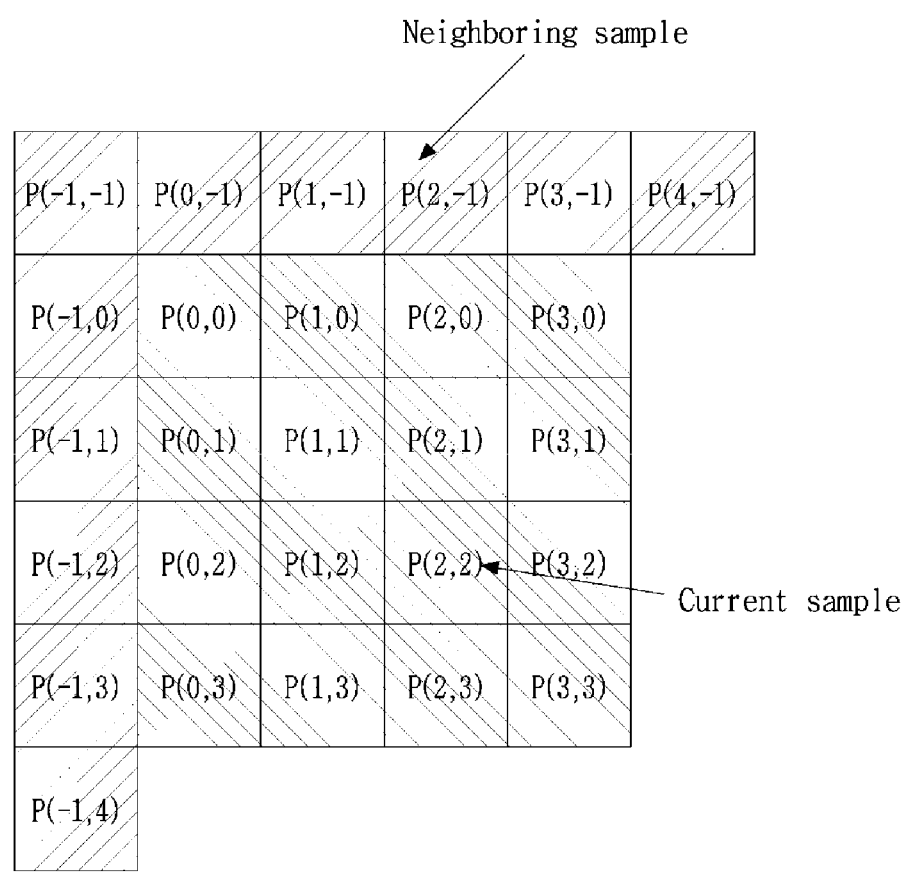
FIG. 11 is a diagram illustrating a method of correcting a prediction sample of a current block based on differential information of neighboring samples according to an embodiment of the present invention.

FIG. 11 is a diagram illustrating a method of correcting a prediction sample of a current block based on differential information of neighboring samples according to an embodiment of the present invention.

The prediction sample of the current block may be corrected based on the differential information of multiple neighboring samples for the current block. The correction may be performed on all prediction samples in the current block, or may be performed on prediction samples in pre-determined partial regions. The partial regions may be one row/column or multiple rows/columns, and these may be preset regions for correction in the device for encoding/decoding a video. For example, correction may be performed on a one row/column located at a boundary of the current block or may be performed on plurality of rows/columns from a boundary of the current block. Alternatively, the partial regions may be variably determined based on at least one of the size/shape of the current block and the intra prediction mode.

The neighboring samples may belong to the neighboring blocks positioned at the top, the left, and the top left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have variable positions depending on the position of the prediction sample which is the correction target.

The differential information of the neighboring samples may mean a differential sample between the neighboring samples, or may mean a value obtained by scaling the differential sample by a predetermined constant value (e.g., one, two, three, etc.). Here, the predetermined constant value may be determined considering the position of the prediction sample which is the correction target, the position of the column or row including the prediction sample which is the correction target, the position of the prediction sample within the column or row, etc.

For example, when the intra prediction mode of the current block is the vertical mode, differential samples between the top left neighboring sample p(−1, −1) and neighboring samples p(−1, y) adjacent to the left boundary of the current block may be used to obtain the final prediction sample as shown in Equation 1.

$$P'(0,y)=P(0,y)+((p(-1,y)-p(-1,-1))>>1 \text{ for } y=0 \ldots N-1 \quad [\text{Equation 1}]$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample as shown in Equation 2.

$$P'(x,0)=p(x,0)+((p(x,-1)-p(-1,-1))>>1 \text{ for } x=0 \ldots N-1 \quad [\text{Equation 2}]$$

For example, when the intra prediction mode of the current block is the vertical mode, differential samples between the top left neighboring sample p(−1, −1) and neighboring samples p(−1, y) adjacent to the left boundary of the current block may be used to obtain the final prediction sample. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Equation 3 and Equation 4.

$$P'(0,y)=P(0,y)+((p(-1,y)-p(-1,-1))>>1 \text{ for } y=0 \ldots N-1 \quad [\text{Equation 3}]$$

$$P'(1,y)=P(1,y)+((p(-1,y)-p(-1,-1))>>2 \text{ for } y=0 \ldots N-1 \quad [\text{Equation 4}]$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample, as described in the case of the vertical mode. For example, the prediction sample may be corrected as shown in Equation 5 and Equation 6.

$$P'(x,0)=p(x,0)+((p(x,-1)-p(-1,-1))>>1 \text{ for } x=0 \ldots N-1 \quad [\text{Equation 5}]$$

$$P'(x,1)=p(x,1)+((p(x,-1)-p(-1,-1))>>2 \text{ for } x=0 \ldots N-1 \quad [\text{Equation 6}]$$

Figure 12:
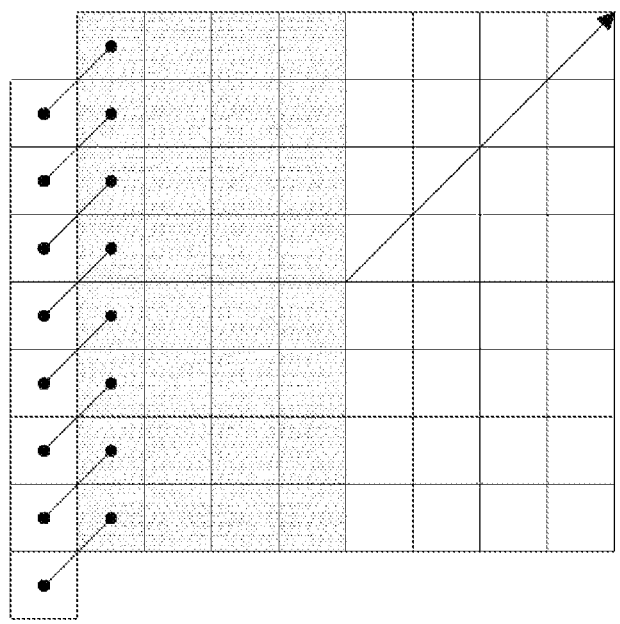
FIGS. 12 and 13 are diagrams illustrating a method of correcting a prediction sample based on a predetermined correction filter according to an embodiment of the present invention.
Figure 13:
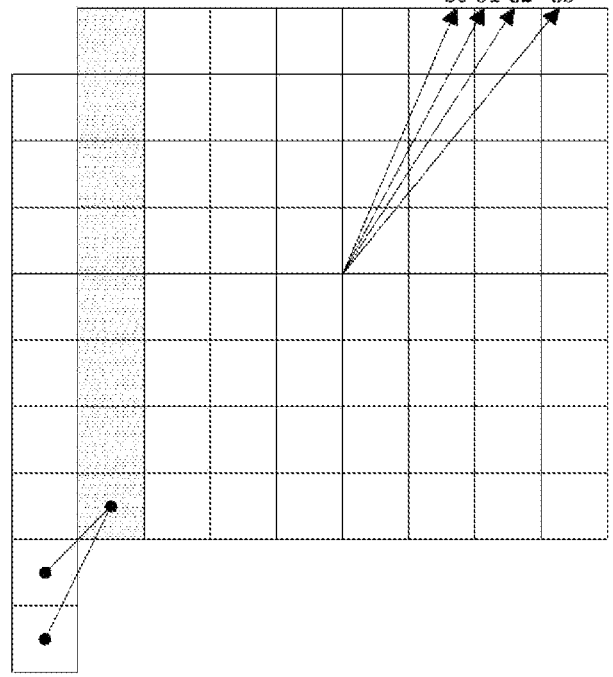

FIGS. 12 and 13 are diagrams illustrating a method of correcting a prediction sample based on a predetermined correction filter according to an embodiment of the present invention.

The prediction sample may be corrected based on the neighboring sample of the prediction sample which is the correction target and a predetermined correction filter. Here, the neighboring sample may be specified by an angular line of the directional prediction mode of the current block, or may be at least one sample positioned on the same angular line as the prediction sample which is the correction target. Also, the neighboring sample may be a prediction sample in the current block, or may be a reconstructed sample in a neighboring block reconstructed before the current block.

At least one of the number of taps, strength, and a filter coefficient of the correction filter may be determined based on at least one of the position of the prediction sample which is the correction target, whether or not the prediction sample which is the correction target is positioned on the boundary of the current block, the intra prediction mode of the current block, angle of the directional prediction mode, the prediction mode (inter or intra mode) of the neighboring block, and the size/shape of the current block.

Referring to FIG. 12, when the directional prediction mode has an index of 2 or 34, at least one prediction/reconstructed sample positioned at the bottom left of the prediction sample which is the correction target and the predetermined correction filter may be used to obtain the final prediction sample. Here, the prediction/reconstructed sample at the bottom left may belong to a previous line of a line including the prediction sample which is the correction target. The prediction/reconstructed sample at the bottom left may belong to the same block as the current sample, or to neighboring block adjacent to the current block.

Filtering for the prediction sample may be performed only on the line positioned at the block boundary, or may be performed on multiple lines. The correction filter where at least one of the number of filter taps and a filter coefficient is different for each of lines may be used. For example, a (½, ½) filter may be used for the left first line closest to the block boundary, a (12/16, 4/16) filter may be used for the second line, a (14/16, 2/16) filter may be used for the third line, and a (15/16, 1/16) filter may be used for the fourth line.

Alternatively, when the directional prediction mode has an index of 3 to 6 or 30 to 33, filtering may be performed on the block boundary as shown in FIG. 13, and a 3-tap correction filter may be used to correct the prediction sample. Filtering may be performed using the bottom left sample of the prediction sample which is the correction target, the bottom sample of the bottom left sample, and a 3-tap correction filter that takes as input the prediction sample which is the correction target. The position of neighboring sample used by the correction filter may be determined differently based on the directional prediction mode. The filter coefficient of the correction filter may be determined differently depending on the directional prediction mode.

Different correction filters may be applied depending on whether the neighboring block is encoded in the inter mode or the intra mode. When the neighboring block is encoded in the intra mode, a filtering method where more weight is given to the prediction sample may be used, compared to when the neighboring block is encoded in the inter mode. For example, in the case of that the intra prediction mode is 34, when the neighboring block is encoded in the inter mode, a (½, ½) filter may be used, and when the neighboring block is encoded in the intra mode, a (4/16, 12/16) filter may be used.

The number of lines to be filtered in the current block may vary depending on the size/shape of the current block (e.g., the coding block or the prediction block). For example, when the size of the current block is equal to or less than 32×32, filtering may be performed on only one line at the block boundary; otherwise, filtering may be performed on multiple lines including the one line at the block boundary.

FIGS. 12 and 13 are based on the case where the 35 intra prediction modes in FIG. 7 are used, but may be equally/similarly applied to the case where the extended intra prediction modes are used.

Figure 14:
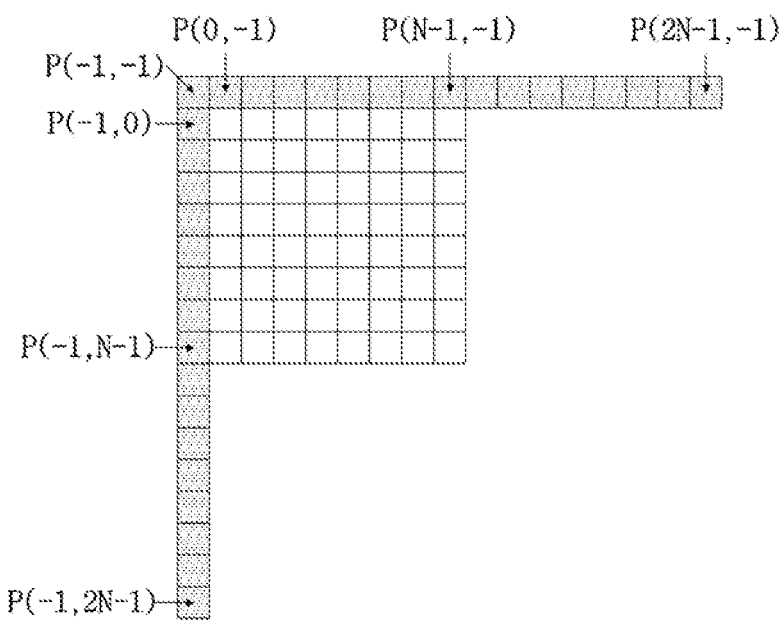
FIG. 14 shows a range of reference samples for intra prediction according to an embodiment to which the present invention is applied.

FIG. 14 shows a range of reference samples for intra prediction according to an embodiment to which the present invention is applied.

Referring to FIG. 14, intra prediction may performed by using reference samples P(−1, −1), P(−1, y) (0<=y<=2N−1) and P(x, −1) (0<=x<=2N−1) located at a boundary of a current block. At this time, filtering on reference samples is selectively performed based on at least one of an intra prediction mode (e.g., index, directionality, angle, etc. of the intra prediction mode) of the current block or a size of a transform block related to the current block.

Filtering on reference samples may be performed using an intra filter pre-defined in an encoder and a decoder. For example, an intra filter with a filter coefficient of (1, 2, 1) or an intra filter with a filter coefficient of (2, 3, 6, 3, 2) may be used to derive final reference samples for use in intra prediction.

Alternatively, at least one of a plurality of intra filter candidates may be selected to perform filtering on reference samples. Here, the plurality of intra filter candidates may differ from each other in at least one of a filter strength, a filter coefficient or a tap number (e.g., a number of filter coefficients, a filter length). A plurality of intra filter candidates may be defined in at least one of a sequence, a picture, a slice, or a block level. That is, a sequence, a picture, a slice, or a block in which the current block is included may use the same plurality of intra filter candidates.

Hereinafter, for convenience of explanation, it is assumed that a plurality of intra filter candidates includes a first intra filter and a second intra filter. It is also assumed that the first intra filter is a (1, 2, 1) 3-tap filter and the second intra filter is a (2, 3, 6, 3, 2) 5-tap filter.

When reference samples are filtered by applying a first intra filter, the filtered reference samples may be derived as shown in Equation 7.

$$P(-1,-1)=(P(-1,0)+2P(-1,-1)+P(0,-1)+2)>>2$$

$$P(-1,y)=(P(-1,y+1)+2P(-1,y)+P(-1,y-1)+2)>>2$$

$$P(x,-1)=(P(x+1,-1)+2P(x,-1)+P(x-1,-1)+2)>>2 \quad \text{[Equation 7]}$$

When reference samples are filtered by applying the second intra filter, the filtered reference samples may be derived as shown in the following equation 8.

$$P(-1,-1)=(2P(-2,0)+3P(-1,0)+6P(-1,-1)+3P(0,-1)+2P(0,-2)+8)>>4$$

$$P(-1,y)=(2P(-1,y+2)+3P(-1,y+1)+6P(-1,y)+3P(-1,y-1)+2P(-1,y-2)+8)>>4$$

$$P(x,-1)=(2P(x+2,-1)+3P(x+1,-1)+6P(x-1)+3P(x-1,-1)+2P(x-2,-1)+8)>>4 \quad \text{[Equation 8]}$$

In the above Equations 7 and 8, x may be an integer between 0 and 2N−2, and y may be an integer between 0 and 2N−2.

Figure 15:
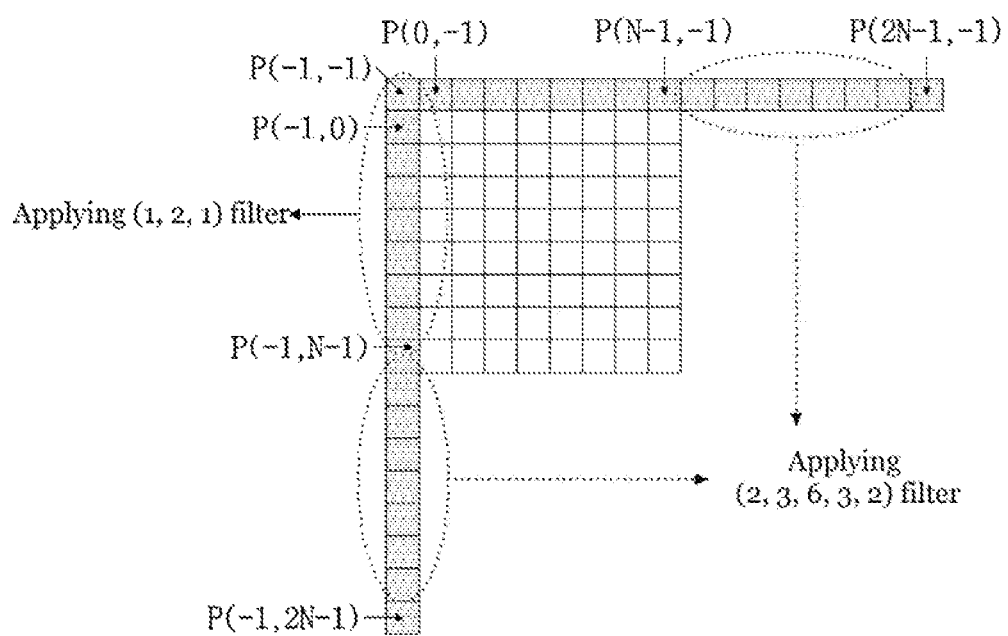

Alternatively, based on a position of a reference sample, one of a plurality of intra filter candidates may be determined, and filtering on the reference sample may be performed by using the determined one. For example, a first intra filter may be applied to reference samples included in a first range, and a second intra filter may be applied to reference samples included in a second range. Here, the first range and the second range may be distinguished based on whether they are adjacent to a boundary of a current block, whether they are located at a top side or a left side of a current block, or whether they are adjacent to a corner of a current block. For example, as shown in FIG. 15, filtering on reference samples (P(−1, −1), P(−1,0), P(−1,1), . . . , P(−1, N−1) and P(0, −1), P(1, −1), . . . ) which are adjacent to a boundary of the current block is performed by applying a first intra filter as shown in Equation 7, and filtering on the other reference samples which are not adjacent to a boundary of the current block is performed by applying a second reference filter as shown in Equation 8. It is possible to select one of a plurality of intra filter candidates based on a transform type used for a current block, and perform filtering on reference samples using the selected one. Here, the transform type may mean (1) a transform scheme such as DCT, DST or KLT, (2) a transform mode indicator such as a 2D transform, 1D transform or non-transform or (3) the number of transforms such as a first transform and a second transform. Hereinafter, for convenience of description, it is assumed that the transform type means the transform scheme such as DCT, DST and KLT.

For example, if a current block is encoded using a DCT, filtering may be performed using a first intra filter, and if a current block is encoded using a DST, filtering may be performed using a second intra filter. Or, if a current block is encoded using DCT or DST, filtering may be performed using a first intra filter, and if the current block is encoded using a KLT, filtering may be performed using a second intra filter.

Filtering may be performed using a filter selected based on a transform type of a current block and a position of a reference sample. For example, if a current block is encoded using the a DCT, filtering on reference samples P(−1, −1), P(−1,0), P(−1,1), . . . , P(−1, N−1) and P(0, −1), P(1, −1), . . . , P(N−1, −1) may be performed by using a first intra filter, and filtering on other reference samples may be performed by using a second intra filter. If a current block is encoded using a DST, filtering on reference samples P(−1, −1), P(−1,0), P(−1,1), . . . , P(−1, N−1) and P(0, −1), P(1, −1), . . . , P(N−1, −1) may be performed by using a second intra filter, and filtering on other reference samples may be performed by using a first intra filter.

One of a plurality of intra filter candidates may be selected based on whether a transform type of a neighboring block including a reference sample is the same as a transform type of a current block, and the filtering may be performed using the selected intra filter candidate. For example, when a current block and a neighboring block use the same transform type, filtering is performed using a first intra filter, and when transform types of a current block and of a neighboring block are different from each other, the second intra filter may be used to perform filtering.

It is possible to select any one of a plurality of intra filter candidates based on a transform type of a neighboring block and perform filtering on a reference sample using the selected one. That is, a specific filter may be selected in consideration of a transform type of a block in which a reference sample is included. For example, as shown in FIG. 16, if a block adjacent to left/lower left of a current block is a block encoded using a DCT, and a block adjacent to top/top right of a current block is a block encoded using a DST, filtering on reference samples adjacent to left/lower left of a current block is performed by applying a first intra filter and filtering on reference samples adjacent to top/top right of a current block is performed by applying a second intra filter.

In units of a predetermined region, a filter usable in the corresponding region may be defined. Herein, the unit of the predetermined region may be any one of a sequence, a picture, a slice, a block group (e.g., a row of coding tree units) or a block (e.g., a coding tree unit) Or, another region may be defined that shares one or more filters. A reference sample may be filtered by using a filter mapped to a region in which a current block is included.

For example, as shown in FIG. 17, it is possible to perform filtering on reference samples using different filters in CTU units. In this case, information indicating whether the same filter is used in a sequence or a picture, a type of filter used for each CTU, an index specifying a filter used in the corresponding CTU among an available intra filter candidates may be signaled via a sequence parameter set (SPS) or a picture parameter set (PPS).

The above-described intra filter may be applied in units of a coding unit. For example, filtering may be performed by applying a first intra filter or a second intra filter to reference samples around a coding unit.

When an intra-prediction mode of a current block is determined, intra-prediction may be performed using a reference sample adjacent to the current block. For example, prediction samples of a current block may be generated by averaging reference samples, or may be generated by duplicating reference samples in a specific direction considering a directionality of an intra-prediction mode. As described above in an example referring to FIG. 14, $P(-1, -1)$, $P(-1, y)$ ($0<=y<=2N-1$), $P(x, -1)$ ($0<=x<=2N-1$) which are located at a boundary of a current block may be used as reference samples.

When it is determined that a sample included in a neighboring block adjacent to a current block is not available as a reference sample, the sample that is not available may be replaced with a reference sample that is available. For example, a neighboring sample may be determined as unavailable in case where a position of a sample included in a neighboring block is outside a picture, a sample included in a neighboring block is present in a slice different from a current block, or a sample included in a neighboring block is included in a block encoded by an inter-prediction. Here, whether or not a sample included in a block encoded by an inter-prediction is unavailable may be determined based on information indicating whether to use a sample included in a block encoded by an inter-prediction as a reference sample when performing intra-prediction of a current block. Here, the information may be a 1-bit flag (e.g., 'constrained_intra_prediction_flag'), but is not limited thereto. For example, when a value of 'constrained_intra_prediction_flag' is 1, a sample included in a block encoded by an inter-prediction may be determined to be unavailable as a reference sample. Hereinafter, a sample that cannot be used as a reference sample will be referred to as a unavailable reference sample.

In the example shown in FIG. 14, when it is determined that a sample located at left lowermost (e.g., $P(-1, 2N-1)$) is not available, the sample located at left lowermost may be replaced with a first available reference sample which is firstly searched by scanning available samples in a predetermined order. Here, the scanning order may be sequentially performed from a sample adjacent to the left lowermost sample. For example, in the example shown in FIG. 14, when a sample $P(-1, 2N-1)$ is not available, scanning may be performed in an order of $P(-1, -2N-2)$ to $P(-1, -1)$, $P(-1)$ to $P(2N-1, -1)$. $P(-1, 2N-1)$ may be replaced with a first available reference sample that is found as a result of the scan.

When a left reference sample except for a reference sample located at left lowermost is unavailable, the left reference sample may be replaced with a reference sample adjacent to a bottom of the left reference sample. For example, an unavailable reference sample $P(-1, y)$ between $P(-1, 2N-1)$ and $P(-1, -1)$ may be replaced with a reference sample $P(-1, y+1)$.

When a top reference sample is unavailable, the top reference sample may be replaced with a reference sample adjacent to a left of the top reference sample. For example, an unavailable reference sample $P(x, -1)$ between $P(0, -1)$ and $P(2N-1, -1)$ may be replaced with a reference sample $P(x-1, -1)$.

A reference sample set for a current block may be referred to as a 'reference line' (or 'intra-reference line' or 'reference sample line'). Here, the reference line may include a set of reference samples composed of one row and one column. For example, in the example shown in FIG. 14, a 'reference line' a reference sample set including $P(-1, 2N-1)$ to $P(-1, 1)$, $P(0, -1)$ to $P(2N-2, -1)$. An intra-prediction of a current block may be performed based on reference samples included in a reference line. An intra-prediction of a current block may be performed, using reference samples included in a reference line, based on an intra-prediction mode of a current block. For example, when an intra-prediction mode of a current block is a DC mode, a prediction signal may be generated using an average and weighted prediction of reference samples included in the reference line. For example, when an intra-prediction mode of a current block is a DC mode, prediction samples of the current block may be obtained according to Equation 9.

$$P(0,0)=(P(-1,0)+P(0,-1)+2*dcVal)>>2$$

$$P(x,0)=(P(x,-1)+3*dcVal)>>2$$

$$P(0,y)=(P(-1,y)+3(dcVal))>>2 \quad \text{[Equation 9]}$$

In Equation 9, dcVal may be generated based on an average value of samples except for $P(-1, -1)$ among reference samples included in a reference line.

A planar mode provides effective prediction efficiency in a smooth area having no strong edges, and is effective in improving discontinuity of block boundary or image quality deterioration of a block boundary. When an intra-prediction mode of a current block is a planar mode, a horizontal direction provisional prediction sample of the current block may be obtained using a reference sample adjacent to a top right corner of the current block and a reference sample having y coordinate identical to the horizontal direction provisional prediction sample, and a vertical direction provisional prediction sample of the current block may be obtained using a reference sample adjacent to a bottom left corner of the current block and a reference sample having x coordinate identical to the vertical direction provisional prediction sample. For example, a horizontal direction provisional prediction sample and a vertical direction provisional prediction sample of a current block may be obtained by according to Equation 10.

$$P_h(x,y)=(N-1-x)*P(-1,y)+(x+1)*P(N,-1)$$

$$P_v(x,y)=(N-1-y)*P(x,-1)+(y+1)*P(-1,N) \quad \text{[Equation 10]}$$

A prediction sample of a current block may be generated by summing a horizontal direction provisional prediction sample and a vertical direction provisional prediction sample, and then shifting the summation result by a value determined according to a size of a current block. For example, a prediction sample of a current block may be obtained according to Equation 11.

$$P(x,y)=(P_h(x,y)+Pv(x,y)+N)>>(\log 2(N)+1)$$ [Equation 11]

An intra-prediction of a current block may be performed using a plurality of reference lines. Lengths of the plurality of reference lines may be all or part of the same, or may be set different from each other.

For example, assuming that a current block has a W×H size, k-th reference line may include p(−k, −k), reference samples located in a row identical to p(−k, −k) (e.g., reference samples from p(k+1, −k) to p(W+H+2(k−1), −k) or reference samples from p(−k+1, −k) to p(2W+2(k−1), −k)) and reference samples located in a column identical to p(−k, −k) (e.g., reference samples from p(−k, −k+1) to p(−k, W+H+2(k−1)) or reference samples from p(−k, −k+1) to p(−k, 2H+2(k−1))).

Figure 18:
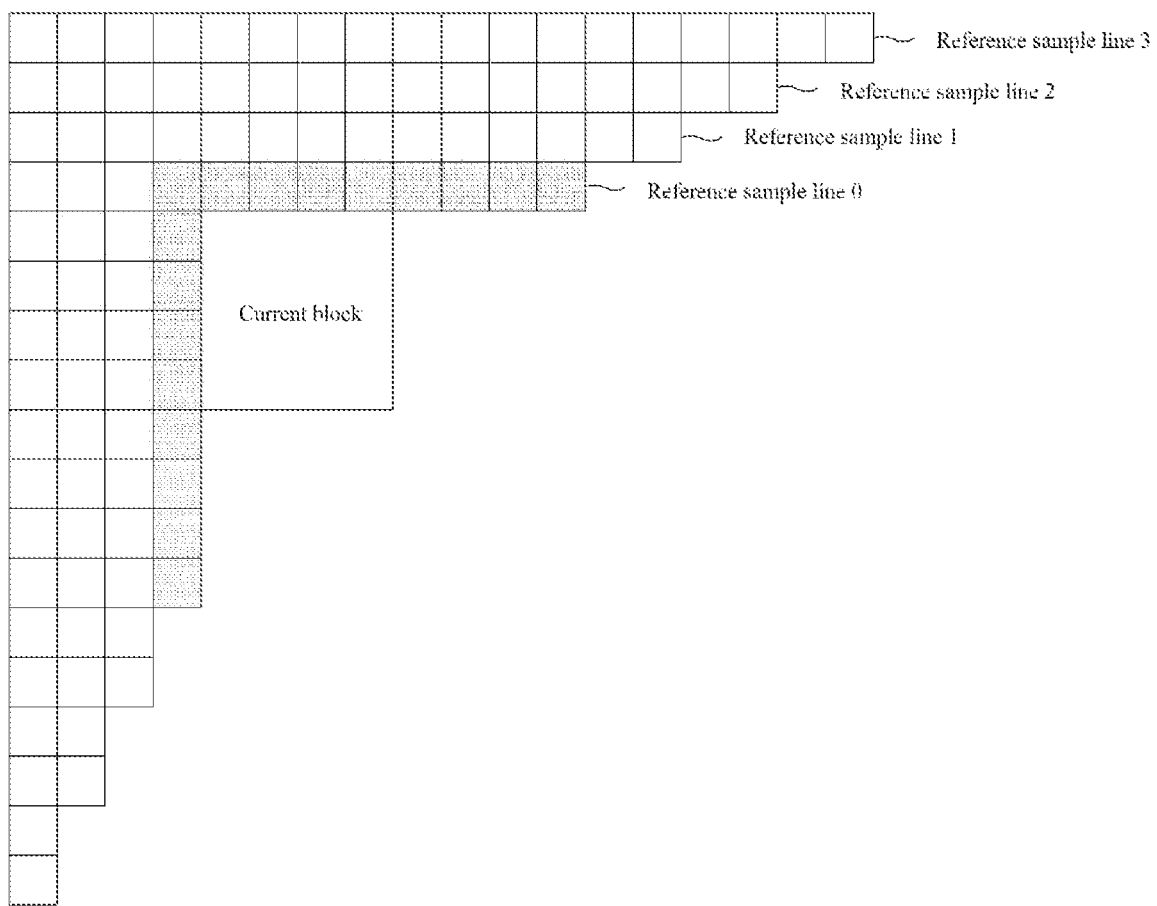
FIG. 18 is a diagram illustrating a plurality of reference sample lines according to an embodiment of the present invention.

FIG. 18 exemplifies a plurality of reference sample lines. As in the example shown in FIG. 18, when a first reference line adjacent to a boundary of a current block is referred to as a 'reference line 0', k-th reference line may be set adjacent to (k−1)-th reference line.

Alternatively, unlike the example shown in FIG. 18, it is also possible to configure all the reference lines to have the same number of reference samples.

An intra-prediction of a current block may be performed by at least one of a plurality of reference lines. A method of performing intra-prediction using a plurality of reference lines as described above may be referred to as an 'intra-prediction method using an extended reference sample' or an 'extended intra-prediction method.' In addition, a plurality of reference lines can be referred to as an 'extended reference line'.

Whether or not performing intra-prediction using an extended reference line may be determined based on information signaled through a bitstream. Here, the information may be a 1-bit flag, but is not limited thereto. Information on whether performing intra-prediction using an extended reference line may be signaled in units of a coding tree unit, an encoding unit or a prediction unit, or may be signaled in units of a sequence, a picture or a slice. That is, whether to perform intra prediction using the extended reference line may be determined in units of a sequence, a picture, a slice, a CTU, a CU, or a PU.

Alternatively, whether or not performing intra-prediction using an extended reference line may be determined based on at least one of a size, shape, depth or intra-prediction mode of a current block.

For example, it may be determined whether to perform intra prediction using an extended reference line, depending on whether a current block has a square shape or a non-square shape. For example, if the current block has the square shape, intra prediction of the current block may be performed using the extended reference line, as in the example shown in FIG. 19A. That is, when the current block has the square shape, intra prediction may be performed using at least one of a plurality of reference lines around the current block. On the other hand, when the current block has the non-square shape, intra prediction of the current block may be performed without using the extended reference line, as in the example shown in FIG. 19B. That is, when the current block has the non-square shape, intra prediction may be performed using one reference line adjacent to the current block.

Figure 19A:
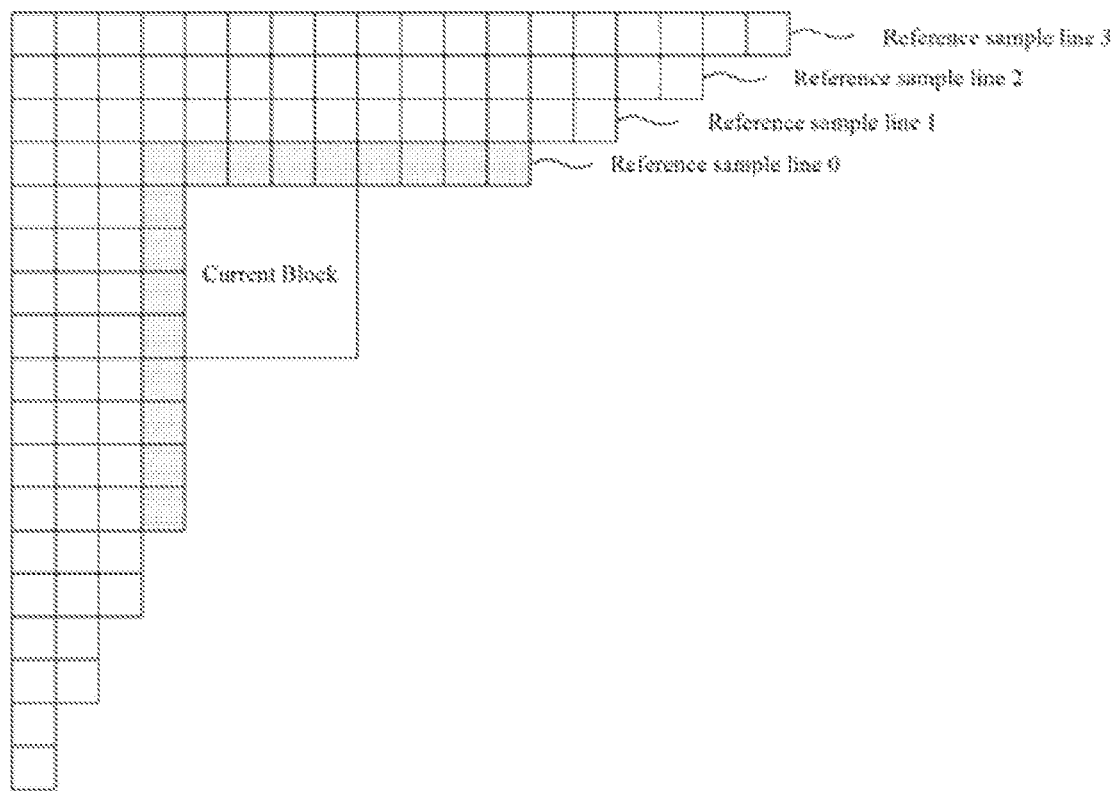
FIGS. 19A and 19B are diagrams illustrating an example in which a use of an extended reference line is determined according to a shape of a current block, according to an embodiment of the present invention.
Figure 19B:
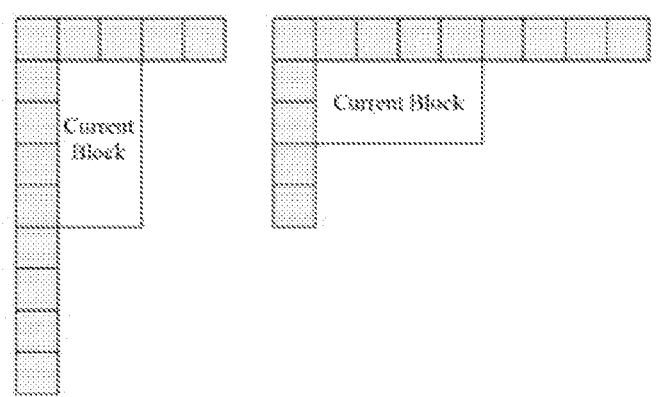

In contrast to the example shown in FIGS. 19A and 19B, when the current block has the non-square shape, intra prediction may be performed using an extended reference line, and when the current block has the square shape, intra prediction may be performed without using the extended reference line.

When it is determined to perform intra-prediction using an extended reference line, a number of reference lines may be determined. Here, a number of reference lines may have a fixed value, and may be adaptively determined according to a size, shape or intra-prediction mode of a current block. For example, when an intra-prediction mode of a current block is a non-directional mode, intra-prediction of the current block is performed using one reference line. When an intra-prediction mode of a current block is a directional mode, intra-prediction of the current block may be performed using a plurality of reference lines.

For an additional example, a number of reference lines may be determined by information that is signaled in units of a sequence, a picture, a slice or a unit to be decoded. Here, the unit to be decoded may represents a coding tree unit, a coding unit, a transform unit, a prediction unit, or the like. For example, a syntax element 'max_intra_line_idx_minus2' indicating a number of available reference lines available in a sequence or a slice may be signaled through a sequence header or a slice header. In this case, the number of available reference lines may be set to max_intra_line_idx_minus2+2.

Hereinafter, a method of performing intra-prediction using an extended reference line will be described in detail.

Figure 20:
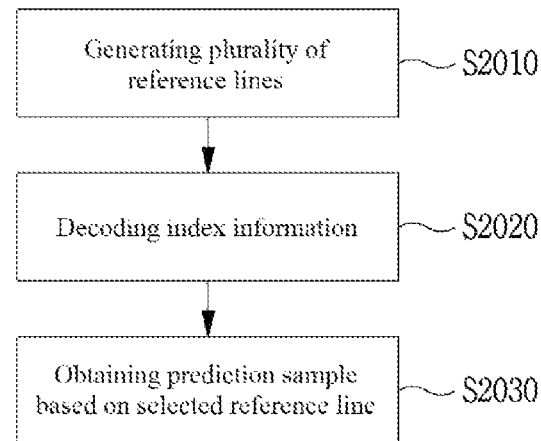
FIG. 20 is a flowchart illustrating a method of performing intra-prediction using an extended reference line according to the present invention.

FIG. 20 is a flowchart illustrating a method of performing intra-prediction using an extended reference line according to the present invention.

First, a decoder may generate a plurality of reference lines (S2010). Reference samples included in each reference line may be generated based on reconstructed samples included in blocks decoded earlier than a current block.

When an intra-prediction mode of a current block is a directional mode, a decoder may generate a reference line considering a directionality of the intra-prediction mode. Considering a directionality of an intra-prediction mode, a larger number of reference samples may be included in k-th reference line than in (k−1)-th reference line. That is, a reference line away from a current block may include a larger number of reference samples than a reference line near the current block.

Here, a number of reference samples further included in k-th reference line than in (k−1)-th reference line may be variably determined according to a size, a shape or an intra prediction mode of a current block.

For example, when a current block has a 4×4 size, k-th reference line may further include four (specifically, 2 in horizontal direction and 2 in vertical direction) reference samples than (k−1)-th reference line. In addition, when a current block has a size of 8×8, k-th reference line may further include eight (specifically, 4 in horizontal direction and 4 in vertical direction) reference samples than (k−1)-th reference line.

Referring to FIG. 18, as a size of a current block size is 4×4, it is exemplified that a first reference sample includes a total of 9 reference samples and a second reference sample includes a total of 13 (=9+2×2) reference samples.

When a current block is non-square, a number of reference samples included in a reference line may be determined according to a horizontal and vertical lengths of a current block.

Figure 21:
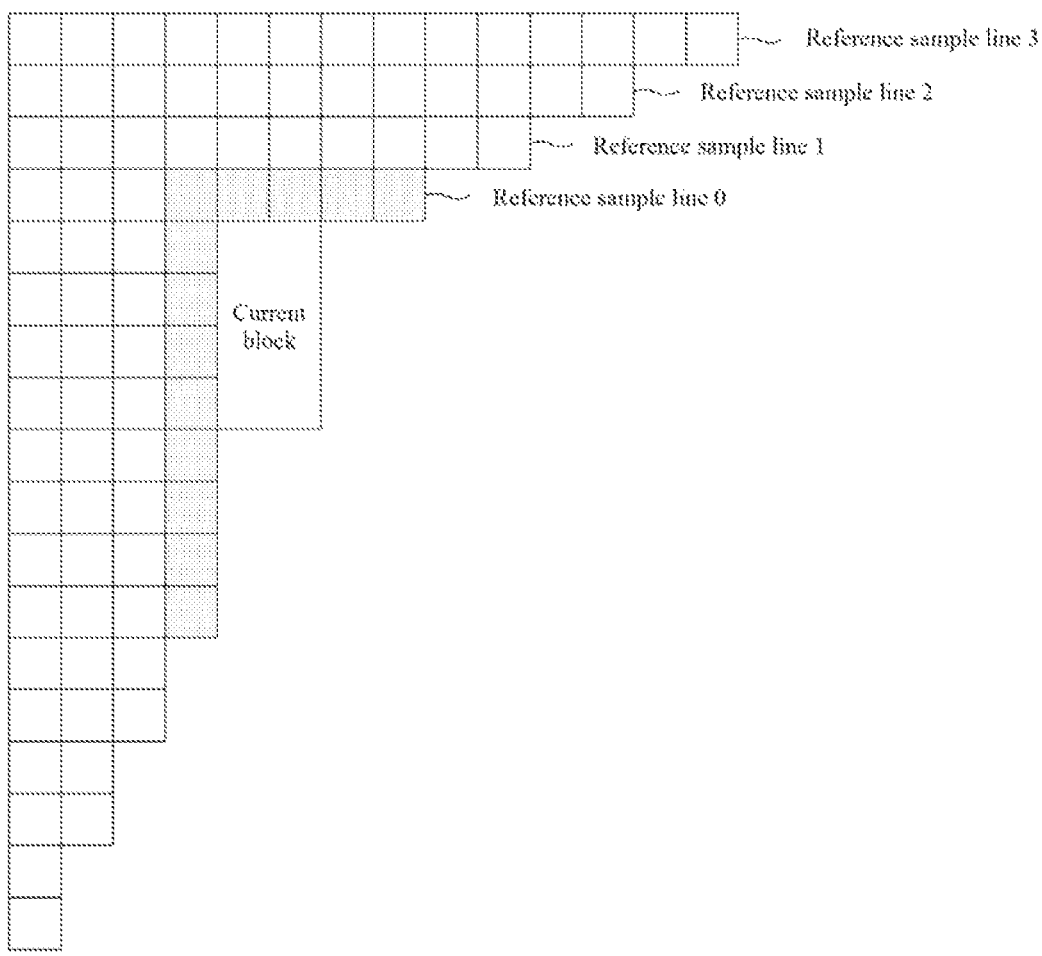
FIG. 21 is a diagram illustrating a plurality of reference lines for a non-square block according to the present invention.

For an example, FIG. 21 is a diagram exemplifying a plurality of reference lines for a non-square block. Describing with comparing FIGS. 18 and 21, as a width of a current block decreases to ½, a number of top reference samples except for a top left reference sample included in a reference line 0 is reduced from 8 to 4.

That is, according to FIGS. 15 and 17, when assuming that a current block has a W×H size, k-th reference line may include a total of 2{(W+H)+2(k−1)}+1 reference samples including W+H+2(k−1) top reference samples (or 2W+2(k−1) top reference samples) (i.e., horizontal direction reference samples), W+H+2(k−1) left reference samples (or 2H+2(k−1) left reference samples) (i.e., vertical direction reference samples) and top left reference sample.

If a reference sample that is not available is included in a reference line, the unavailable reference sample may be replaced with a neighboring available reference sample. At this time, the neighboring sample replacing the unavailable reference sample may included in a same reference line as the unavailable reference sample, or may be included in the reference line different from the unavailable reference sample.

For example, if a position of a reference sample is outside a picture or in a slice different from a current block when intra prediction is performed using an extended reference line or if a reference sample is included in a block encoded by inter prediction when intra prediction is performed using an extended reference line, the reference sample may be determined unavailable. The reference sample included in a block encoded by inter prediction may be determined unavailable when it is set that a reference sample included in a block encoded by inter prediction is not used (e.g., only when a value of constrained intra prediction flag is 0). Or, if it is set that a block encoded by intra-prediction should be decoded earlier than a block encoded by inter-prediction, the block encoded by inter-prediction may not yet be reconstructed yet when the block encoded by intra-prediction is decoded. Accordingly, a reference sample included in the block encoded by inter prediction may be determined unavailable.

A reference sample used for replacing an unavailable reference sample may be determined in consideration of a position of the unavailable reference sample, a distance between the unavailable reference sample and the available reference sample, or the like. For example, an unavailable sample may be replaced with an available sample which has a shortest distance from the unavailable reference sample. That is, an available reference sample which has the shortest distance and is selected by comparing a distance (first offset) between an available reference sample included in the same reference line with the unavailable reference sample and the unavailable sample and a distance (second offset) between an available reference sample included in a reference line different from the unavailable reference sample and the unavailable sample may be substituted for the unavailable reference sample. Alternatively, an available reference sample located in a predetermined direction from the unavailable reference sample may replace the unavailable reference sample. Here, the predetermined direction may be a predefined direction (e.g., left, right, up or down) in the encoder/decoder. The predefined direction may be set differently depending on a position of the unavailable reference sample.

Figure 22:
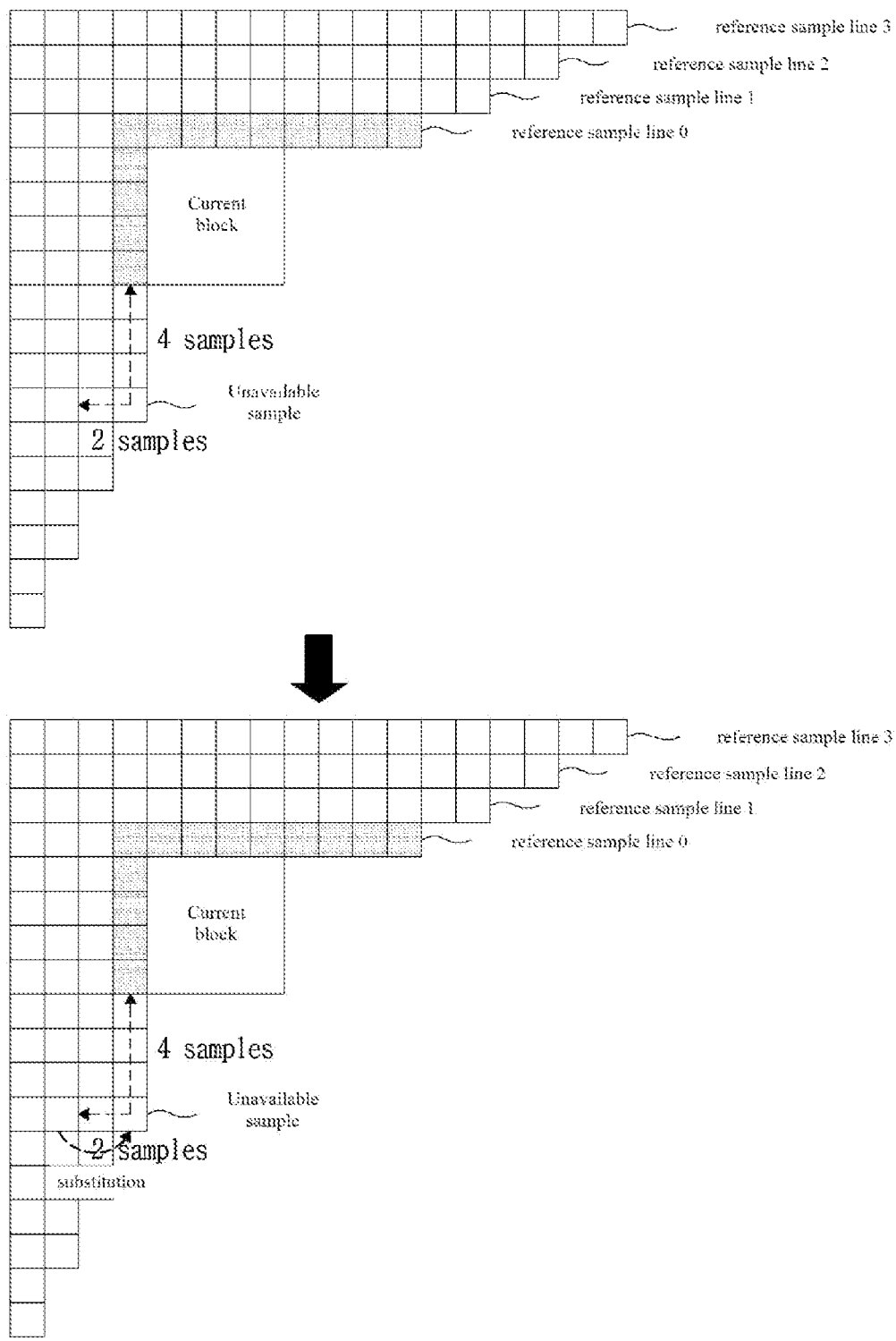
FIG. 22 is a diagram for explaining an example in which an unavailable reference sample is replaced with an available reference sample located at the shortest distance from the unavailable reference sample.

In the example shown in FIG. 22, it is depicted that a distance between the unavailable reference sample included in the reference line 0 and the available reference sample included in the reference line 0 is 4, and a distance between the unavailable reference sample included in the reference line 0 and the available reference sample included in the reference line 2 is 2. Accordingly, the unavailable sample included in the reference line 0 may be substituted by using the available reference sample included in the reference line 2.

If a first offset and a second offset are the same, an unavailable reference sample may be replaced using an available reference sample included in the same reference line as the unavailable reference sample.

An unavailable reference sample may be replaced using an available reference sample included in a reference line different from the unavailable reference sample only when a distance (i.e., a first offset) between an available sample included in the same reference line as the unavailable reference sample and the unavailable reference sample is equal to or greater than N. Alternatively, even when the first offset is equal to or greater than N, an available reference sample included in a reference line different from an unavailable reference sample may be used to replace the unavailable reference sample only when a second offset is smaller than the first offset. Here, N may represent an integer of 1 or more.

If a first offset is not equal to or greater than N, an unavailable reference sample may be replaced using an available reference sample included in the same reference line as the unavailable reference sample.

Figure 23:
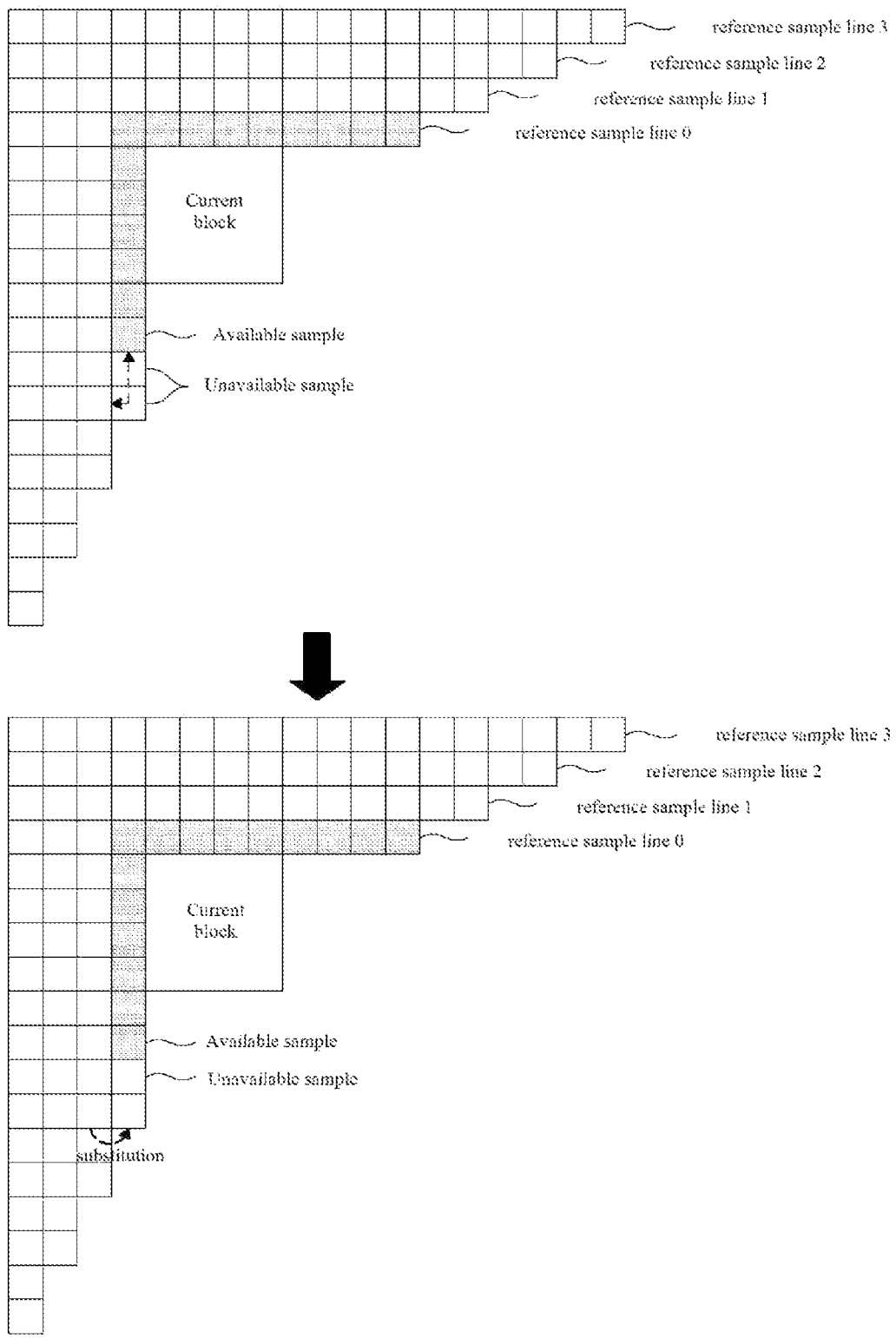
FIGS. 23 and 24 are diagrams for explaining an embodiment in which the position of an available reference sample is determined adaptively according to a distance between an unavailable reference sample and an available reference sample included in the same reference line as the unavailable reference sample.
Figure 24:
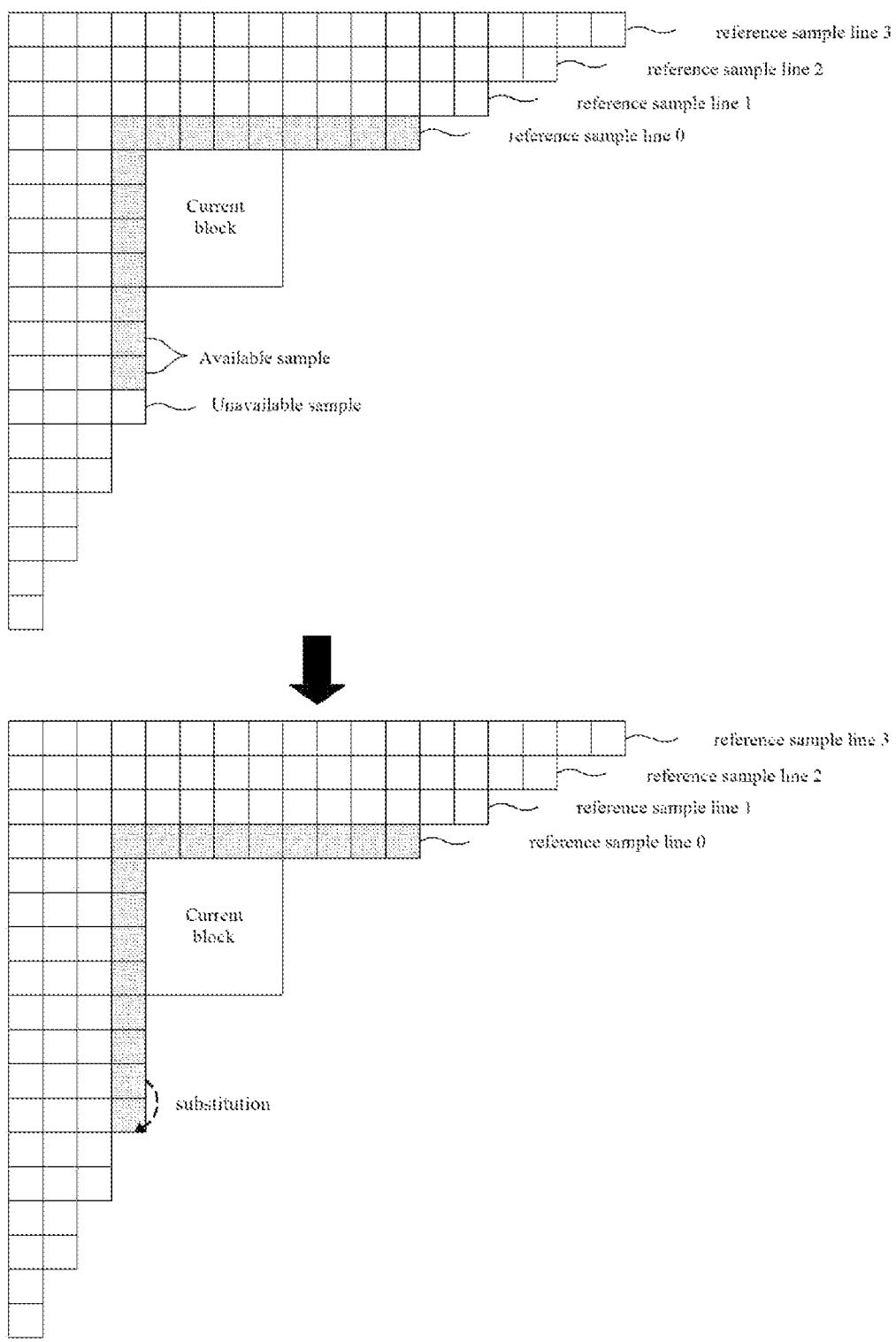

FIGS. 23 and 24 show an example in which an unavailable reference sample is replaced with an available reference sample when N is 2. If a distance between an unavailable reference sample included in reference line 0 and an available reference sample included in the reference line 0 is 2, as in the example shown in FIG. 23, the unavailable reference sample included in the reference line 0 may be replaced using an available reference sample included in reference line 1.

On the other hand, if a distance between an unavailable reference sample included in reference line 0 and an available reference sample included in the reference line 0 is 1, as in the example shown in FIG. 24, the unavailable reference sample included in the reference line 0 may be replaced using the available reference sample included in the reference line 0.

An unavailable reference sample may be replaced using an available reference sample included in the same reference line as the unavailable reference sample or an available reference sample included in a reference line adjacent to a reference line in which the unavailable reference sample is included. Here, a reference line adjacent to a reference line in which the unavailable reference sample is included may refer to a reference line having an index difference of 1 from the reference line including the unavailable reference sample. Alternatively, the unavailable reference sample may be replaced with an available reference sample included in a reference line having an index difference of two or more from the reference line including the unavailable reference sample.

Alternatively, an unavailable reference sample may be replaced using an available reference sample included in a reference line having a larger index value or having a smaller index value than a reference line including the unavailable reference sample. For example, if a reference line having a larger index value than a reference line including the unavailable reference sample is used, a reference sample located at a left or a top of the unavailable reference sample may be used to replace the unavailable reference sample.

A search for an available reference sample to replace an unavailable reference sample may be performed in a predefined direction. For example, only a reference sample located in a direction of either a top, a bottom, a left, or a right of the unavailable sample among reference samples included in the same reference line as the unavailable reference sample may be used to replace the unavailable reference sample. Alternatively, only a reference sample located in a direction of either a top, a bottom, a left, or a right of the unavailable sample among reference samples included in a reference line different from the unavailable reference sample may be used to replace the unavailable sample.

A decoder may decode, based on a bitstream, index information specifying at least one of a plurality of reference lines (S2020). For example, when 4 reference lines are available as in the example shown in FIG. 18, index information may specify at least one of the 4 reference lines.

A reference line for performing intra-prediction for a current block may be adaptively determined based on a size of a current block, a type of a current block, an intra-prediction mode of a current block, index information in a neighboring block or a difference between an intra-prediction mode of a current block and a predetermined intra-prediction mode, and the like.

In addition, the number of reference lines used for intra prediction of a current block may have a fixed value or may be adaptively determined according to a size, a shape, or an intra prediction mode of the current block.

When at least one of a plurality of reference lines is determined, a decoder may perform intra-prediction for a current block using the determined reference line (S2030). In this case, a position of a reference sample used in the intra prediction of the current block in the selected reference line may be derived according to at least one of a type of the intra prediction mode or a directionality of the intra prediction mode of the current block.

Figures 25, 26:
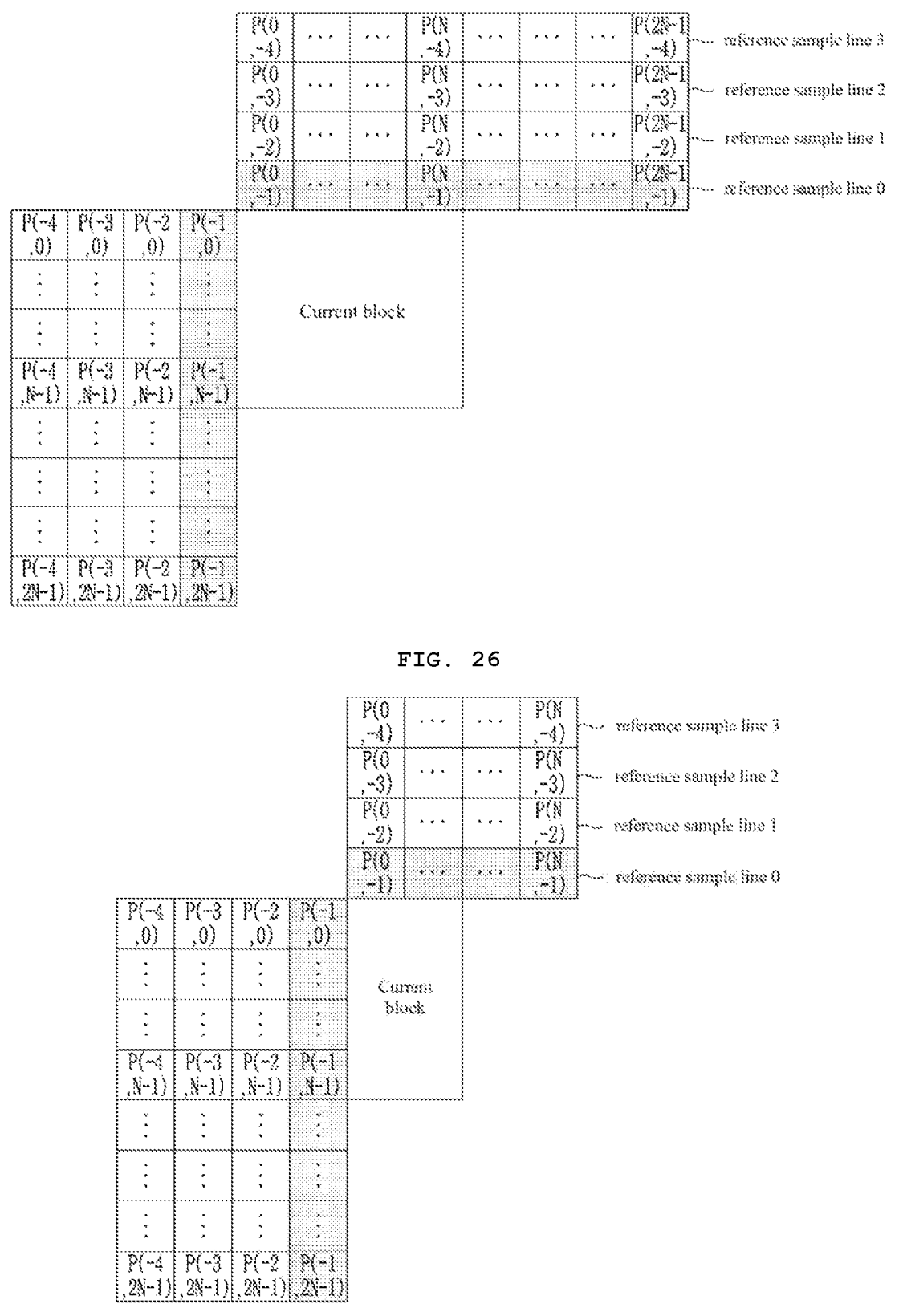

For example, when an intra prediction mode of a current block is DC mode, a prediction sample of the current block may be generated based on an average value (dcVal) of all or a part of reference samples included in the determined reference line. Referring to FIGS. 25 and 26, a calculation of the average value of the reference samples included in the reference line will be described in detail.

Alternatively, when an intra-prediction mode of a current block is a directional mode, a prediction sample of the current block may be generated based on a reference sample specified by the directional mode among reference samples included in the determined reference line. At this time, if a line segment extending from a prediction sample toward the direction indicated by the directional mode points between reference samples, the prediction sample of the current block may be generated based on a weighted sum (weighted prediction) of a first reference sample and a second reference sample which are located at both sides of the point indicated by the line segment extending toward the direction indicated by the directional mode.

When an intra prediction mode of a current block is DC mode, there is need to calculate an average value (dcVal) of reference samples included in a reference line in order to perform prediction on the current block. At this time, the average value for reference samples in k-th reference line may be calculated using only a part of reference samples included in the k-th reference line. At this time, the number of reference samples used to derive the average value may be the same for each reference line, or may be different for each reference line.

Alternatively, an average value for reference samples in k-th reference line may be derived using all of reference samples included in the k-th reference line. Alternatively, it may be determined based on a size of a current block, a shape of a current block, or a position of a reference line whether to derive an average value using a part of reference samples in k-th reference line or to derive an average value using all of reference samples in k-th reference line.

FIG. 25 is a diagram illustrating reference samples used to derive an average value of a reference line.

FIG. 25 shows an example of deriving a reference sample average value of k-th reference line using a part of reference samples included in a reference line. For example, an example illustrated in FIG. 25, a reference sample average value of a first reference line adjacent to a current block (i.e., reference line 0 shown in FIG. 25) may be calculated using top reference samples and left reference samples excluding a reference sample adjacent to a left-top corner of the current block. That is, when a size of the current block is N×N, a total of 4N reference samples such as 2N top reference samples and 2N left reference samples may be used for calculation of the average value of the first reference line.

The number of reference samples used to calculate a reference sample average value of k-th reference line may be same as the number of reference samples used to calculate a reference sample average value of the first reference line. At this time, a position of a reference sample used to calculate the average value of the k-th reference line may correspond to a position of a reference sample used to calculate the reference sample average value of the first reference line.

A reference sample in k-th reference line corresponding to a reference sample of a first reference line may have the same x-coordinate or the same y-coordinate as the reference sample of the first reference line. For example, a coordinate of a top reference sample included in k-th reference line corresponding to a top reference sample P(i, j) included in a first reference line may be P(i,j−k+1) which has the same x coordinate as P(i,j). For example, a coordinate of a left reference sample in k-th reference line corresponding to a left reference sample P(i, j) included in a first reference line may be P(i−k+1,j) which has the same y coordinate as P(i,j).

In FIG. 25, reference samples of second to fourth reference lines corresponding to upper reference sample and left reference sample in a first reference line are shown. A reference sample average value of each reference line may be calculated using the reference samples shown in FIG. 25.

In FIG. 25, it is assumed that a current block has a square shape, but even if the current block has a non-square shape, the above embodiment can be applied as it is. For example, when the current is a non-square block having W×H size, a reference sample average value of each reference line may be calculated using a total of 2(W+H) reference samples, such as 2W top reference samples and 2H left reference samples. Accordingly, as in the example shown in FIG. 26, the number of reference samples used for calculating an average value of the k-th reference line may have the same value as the number of reference samples used for calculating an average value of the first reference line. Also, the location of the reference sample used to calculate the average value of the k-th reference line may correspond to the location of the reference sample used to calculate the reference sample average value of the first reference line.

In FIGS. 25 and 26, top reference samples as much as twice a width of a current block and left reference samples as much as twice a height of the current block are used to calculate a reference sample average value of a reference line. A reference sample average value of a reference line may be calculated using fewer or larger number of reference samples than those shown in FIGS. 25 and 26. Fig. For example, the reference sample average value of the reference line may be calculated using the same number of top reference samples as the width of the current block and the same number of left reference samples as the height of the current block.

A reference sample average value of a reference line may be calculated by assigning different weights to reference samples, depending on a shape of a current block and a position of a reference sample. For example, if the current block has a square shape, the reference sample average value may be calculated by assigning the same weight to top reference samples and left reference samples. On the other hand, when the current block has a non-square shape, the reference sample average value may be calculated by assigning a larger weight to one of top reference samples and left reference samples. For example, if a height of the current block is larger than a width, the average value may be calculated by assigning a larger weight to the top reference samples than the left reference samples. On the other hand, when the width of the current block is larger than the height, the average value may be calculated by assigning a larger weight to the left reference samples than the top reference samples.

For example, when the size of the current block is N/2×N, the average value of the k-th reference line dcVal may be calculated by the following Equation 12.

$$dcVal = \left(\sum_{l=0}^{2N-1} P(-k, l)\right) \gg 2N + \left(\sum_{l=0}^{2N-1} 2 \times P(l, -k)\right) \gg 2N \quad \text{[Equation 12]}$$

For example, when the size of the current block is N×N/2, the average value of the k-th reference line dcVal may be calculated by the following Equation 13.

$$dcVal = \left(\sum_{l=0}^{2N-1} 2 \times P(-k, l)\right) \gg 2N + \left(\sum_{l=0}^{2N-1} P(l, -k)\right) \gg 2N \quad \text{[Equation 13]}$$

In Equations 12 and 13, k may be set to a value between 1 and max_intra_line_idx_minus2+2.

As in the above example, the average value may be calculated using reference samples corresponding to reference samples included in the first intra reference line among reference samples of the k-th intra reference line. At this time, the average value may be calculated based on a predetermined weight. Here, the weight may be derived based on a distance of the first and k-th intra reference lines from the current block.

In the example described through FIG. 20, it is exemplified that index information specifying one of the plurality of reference lines is decoded after generating a plurality of reference lines. It is also possible to obtain only a reference line specified by index information among a plurality of reference lines after decoding the index information specifying one of the plurality of reference lines.

In the embodiment described through FIG. 20, it is described that intra-prediction for a current block is performed using at least one reference line specified by index information among a plurality of reference lines. That is, intra-prediction for a current block may be performed using one reference line or two or more reference lines. Whether or not to use two or more reference lines in performing intra-prediction for a current block may be determined based on information signaled from a bitstream, a size of a current block, a type of a current block, an intra-prediction mode of a current block, whether an intra-prediction mode of a current block is a non-directional or a difference between an intra-prediction mode of a current block and a predetermined intra-prediction mode, and the like.

The two or more reference lines may be specified by a plurality of index information signaled from a bitstream. For example, when two reference lines are set to be used, any one of the two reference lines may be specified by first index information, and the other may be specified by second index information.

Alternatively, two or more reference lines may be spatially contiguous. In this case, index information for specifying any one of the two or more reference lines may be signaled through a bitstream. If any one of the two or more reference lines is selected by the index information, the remaining reference line may be automatically selected based on the spatial adjacency with the selected reference line. For example, when it is set to use two reference lines, and index information indicates 'reference line 0,' then intra-prediction of a current block may be performed based on reference line 0 and reference line 1 neighboring the reference line 0.

When it is set to use a plurality of reference lines, intra-prediction of a current block may be performed based on an average value, a maximum value, a minimum value or a weighted sum of reference samples included in the plurality of reference lines.

For example, assuming that an intra-prediction mode of a current block is a directional mode (i.e., an Angular mode), a predicted sample of the current block may be generated based on a first reference sample and a second reference sample, each of which is included in a difference reference line. Here, a first reference line including the first reference sample and a second reference line including the second reference sample may be positioned neighboring each other, but it is not limited thereto. In addition, the first reference sample and the second reference sample may be determined by an intra prediction mode of the current block. The first reference sample and the second reference sample may be positioned neighboring each other, but it is not limited thereto. A prediction sample of a current block may be generated in consideration of a weighted sum of the first reference sample and the second reference sample, or may be generated based on an average value, a minimum value or a maximum value of the first reference sample and the second reference sample.

Intra-prediction of a current block may be performed by performing a first intra-prediction based on a part of a plurality of reference lines and performing a second intra-prediction based on the remaining reference lines. Here, an intra-prediction mode used in a first intra-prediction and an intra-prediction mode used in a second intra-prediction may be the same or different. A prediction sample of a current block may be generated based on a first prediction sample generated by performing a first intra-prediction and a second prediction sample generated by performing a second intra-prediction.

Reference sample smoothing may be performed on reference samples included in a reference line. That is, at least one of a plurality of filters may be used to filter the reference samples included in the reference line. Intra prediction of the current block may be performed based on unfiltered reference sample or filtered reference sample.

Reference sample smoothing may be performed on all of a plurality of reference lines or on a part of a plurality of reference lines. For example, the reference sample smoothing may be performed on a reference line that is used for intra prediction of the current block among a plurality of reference lines, for example, a reference line specified by index information.

It may be adaptively determined based on at least one of a size of a current block, a type of an intra prediction mode, a directionality of an intra prediction mode, a position of a reference line, a number of reference lines or a variation between reference lines whether to perform reference sample smoothing. The variation between reference lines may represent a difference value between reference samples included in different reference lines. For example, if the size of the prediction block for the current block is 4×4, or if the intra prediction mode of the current block is DC mode, reference sample smoothing may be omitted.

In addition, the number of times in which a filter is applied or a type of a filter may be adaptively determined depending on at least one of a size of a current block, a type of an intra prediction mode, a directionality of an intra prediction mode, a position of a reference line, a number of reference lines, or a variation between reference lines. For example, when the size of a prediction block related to a current block is equal to or less than 32×32 and the intra prediction mode of the current block does not have a horizontal direction, similar to the horizontal direction, a vertical direction, or similar to the vertical direction, the reference filter smoothing may be performed using a first intra filter. On the other hands, when the size of the prediction block relating to the current block is equal to or greater than 32×32 and a variation between reference samples is equal to or less than a predetermined value (i.e., a change of values of the reference samples is not large), the reference sample smoothing may be performed using a second intra filter.

When reference samples included in a reference line is filtered using the first intra filter, a filtered reference sample may be derived as shown in Equation 14.

$$P(-1,-1) = (P(-1,0) + 2*P(-1,-1) + P(0,-1) + 2) \gg 2$$

$$P(-1,y) = (P(-1,y+1) + 2*P(-1,y) + P(-1,y-1) + 2) \gg 2$$

$$P(x,-1) = (P(x+1,-1) + 2*P(x,-1) + P(x-1,-1) + 2) \gg 2 \quad \text{[Equation 14]}$$

When reference samples included in a reference line is filtered using the second intra filter, a filtered reference sample may be derived as shown in Equation 15.

$$P(-1,y) = ((2N-y)*P(-1,-1) + (y+1)*P(-1,2N+2K-1) + N/2) \gg N$$

$$P(x,-1) = ((2N-x)*P(-1,-1) + (x+1)*P(2N+2K-1,-1) + N/2) \gg N \quad \text{[Equation 15]}$$

In the above equations 14 and 15, x may have a value between 0 and 2N−2(k−1), and y may have a value between 0 and 2N−2(k−1). Here, k represents an index of a reference line, and N represents a size of a current block.

Alternatively, a type of an intra filter or the number of times in which an intra filter is applied may be variably determined according to a reference line. For example, different intra filters may be applied depending on an index or a position of a reference line. Or different intra filters may be applied depending on a group to which a reference line belongs. Here, the different filters may be different from each other in at least one of a length of a filter, a filter coefficient, or a filter strength.

As an example, a plurality of reference lines may be classified into at least one group. At this time, each group may include at least one reference line. The grouping may be performed based on at least one of indexes of reference lines, a number of reference lines, or adjacency between reference lines. For example, the plurality of reference lines may be classified into at least one group based on factors such as whether the index of the reference line is an even number or whether the index of the reference line is equal to or greater than a predetermined value.

For example, when a current block uses at least one of a first reference line or a second reference line, intra reference smoothing may be performed using a first intra filter. On the other hand, when the current block uses at least one of a third reference line or a fourth reference line, intra reference smoothing may be performed using a second intra filter. Here, the first intra filter and the second intra filter may be different from each other in at least one of a filter coefficient, a filter tap or a filter strength. For example, filter coefficients of the first intra filter may be (1, 2, 1) and filter coefficients of the second intra filter may be (2, 12, 2).

A filter type to be applied to a reference line may be determined based on at least one of a size of a current block, a type of an intra prediction mode, a directionality of an intra prediction mode, a position of the reference line, the number of reference lines. And one of filters included in the determined filter type may be applied to the reference line based on the enumerated elements. Here, the filter type may be classified according to at least one of a filter length (number of taps), a filter coefficient or a filter strength. For example, first type filters may have the same filter length as each other, but may have a different filter length from the second type filters.

For example, when a size of a prediction block related to a current block is equal to or less than 32×32 and an intra prediction mode of the current block does not have a horizontal direction, a direction similar to the horizontal direction, a vertical direction, or a direction similar to the vertical direction, it may be determined to use the first filter type. And, when the current block uses at least one of a first reference line or a second reference line, reference sample smoothing may be performed using a first intra filter included in the first intra filter type. On the other hand, when the current block uses at least one of a third reference line or a fourth reference line, reference sample smoothing may be performed using a second intra filter included in the first intra filter type. At this time, filter lengths of the first intra filter and the second intra filter are the same while the filter coefficients are different. For example, the filter coefficient of the first intra filter may be (1, 2, 1) and the filter coefficient of the second intra filter may be (2, 12, 2).

The number of available intra prediction modes may be variably determined depending on whether the extended reference line is used or not. That is, depending on whether or not the extended reference line is used, a different number of directional intra prediction modes may be used in units of a sequence, slice, a coding tree unit, a coding unit, or a prediction unit.

Since an efficiency of intra prediction is increased when the extended reference line is used, there is no problem in performing efficient intra prediction even when a smaller number of intra prediction modes are used than when the extended reference line is not used. Thus, depending on whether or not the extended reference line is used, it may be determined whether to use N or less than N directional prediction modes. For example, it may be set that base intra prediction modes (i.e., 33 directional intra prediction modes) are used when the extended reference line is used and extended intra prediction modes (i.e., 65 directional intra prediction modes) are used when the extended reference line is not used.

A type or the number of intra prediction modes available for the current block may be limited according to a position of a reference line used for intra prediction.

For example, as a distance between a current block and a reference line increases, discontinuity between the current block and the reference line increases. Accordingly, as the distance between the current block and the reference line increases, efficiency of intra prediction using a non-directional prediction mode such as DC mode or planar mode decreases. Accordingly, it may be set not to use non-directional prediction mode including at least one of DC mode or planar mode when a reference line having a distance from the current block equal to or greater than a predetermined threshold value is used. For example, when an index of the reference line used for intra prediction of the current block is equal to or greater than L, the non-directional prediction mode including at least one of DC mode and planar mode may not be used. Here, L is an integer including 0, and may be 0, 1, 2, 3, and so on.

Alternatively, the number of available intra prediction modes may be adjusted according to a position of an intra reference line used for intra prediction of a current block. For example, when an index of a reference line used for intra prediction of the current block is equal to or greater than L, base intra prediction modes may be used, and when an index of a reference line is smaller than L, extended intra prediction modes may be used. For example, if L is 2, the extended intra prediction modes (i.e., 67 intra prediction modes) may be used for the first reference line or the second reference line, and the base intra prediction modes (i.e., 35 intra prediction modes) may be used for the third reference line or the fourth reference line.

Depending on an intra prediction mode of a current block or the number of intra prediction modes available for the current block, a reference line that is available to be selected for the current block may be limited. For example, when the intra prediction mode of the current block is a non-directional prediction mode such as DC mode or planar mode, it may be set that a reference line having an index equal to or greater than L is not used for intra prediction of the current block.

Above embodiments have been described mainly on decoding process, encoding process may be performed in the same order as described or in reverse order.

Figure 27:
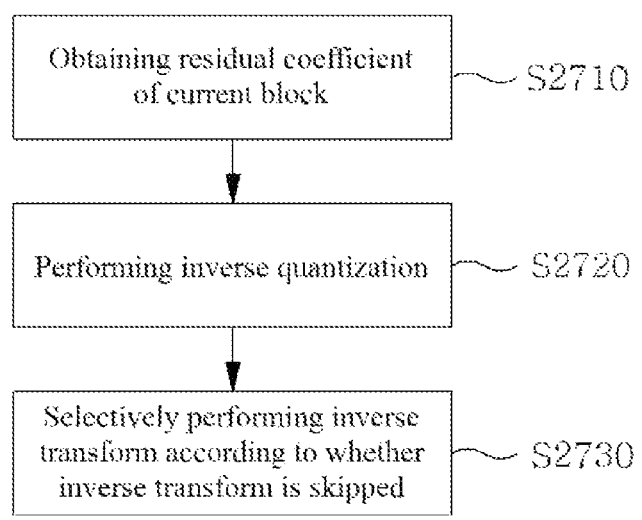
FIG. 27 is a flowchart illustrating processes of obtaining a residual sample according to an embodiment to which the present invention is applied.

FIG. 27 is a flowchart illustrating processes of obtaining a residual sample according to an embodiment to which the present invention is applied.

First, a residual coefficient of a current block may be obtained S2710. A decoder may obtain a residual coefficient through a coefficient scanning method. For example, the decoder may perform a coefficient scan using a jig-zag scan, a vertical scan, or a horizontal scan, and may obtain residual coefficients in a form of a two-dimensional block.

An inverse quantization may be performed on the residual coefficient of the current block S2720.

It is possible to determine whether to skip an inverse transform on the dequantized residual coefficient of the current block S2730. Specifically, the decoder may determine whether to skip the inverse transform on at least one of a horizontal direction or a vertical direction of the current block. When it is determined to apply the inverse transform on at least one of the horizontal direction or the vertical direction of the current block, a residual sample of the current block may be obtained by inverse transforming the dequantized residual coefficient of the current block. Here, the inverse transform can be performed using at least one of DCT, DST, and KLT.

When the inverse transform is skipped in both the horizontal direction and the vertical direction of the current block, inverse transform is not performed in the horizontal direction and the vertical direction of the current block. In this case, the residual sample of the current block may be obtained by scaling the dequantized residual coefficient with a predetermined value.

Skipping the inverse transform on the horizontal direction means that the inverse transform is not performed on the horizontal direction but the inverse transform is performed on the vertical direction. At this time, scaling may be performed in the horizontal direction.

Skipping the inverse transform on the vertical direction means that the inverse transform is not performed on the vertical direction but the inverse transform is performed on the horizontal direction. At this time, scaling may be performed in the vertical direction.

It may be determined whether or not an inverse transform skip technique may be used for the current block depending on a partition type of the current block. For example, if the current block is generated through a binary tree-based partitioning, the inverse transform skip scheme may be restricted for the current block. Accordingly, when the current block is generated through the binary tree-based partitioning, the residual sample of the current block may be obtained by inverse transforming the current block. In addition, when the current block is generated through binary tree-based partitioning, encoding/decoding of information indicating whether or not the inverse transform is skipped (e.g., transform_skip_flag) may be omitted.

Alternatively, when the current block is generated through binary tree-based partitioning, it is possible to limit the inverse transform skip scheme to at least one of the horizontal direction or the vertical direction. Here, the direction in which the inverse transform skip scheme is limited may be determined based on information decoded from the bitstream, or may be adaptively determined based on at least one of a size of the current block, a shape of the current block, or an intra prediction mode of the current block.

For example, when the current block is a non-square block having a width greater than a height, the inverse transform skip scheme may be allowed only in the vertical direction and restricted in the horizontal direction. That is, when the current block is 2N×N, the inverse transform is performed in the horizontal direction of the current block, and the inverse transform may be selectively performed in the vertical direction.

On the other hand, when the current block is a non-square block having a height greater than a width, the inverse transform skip scheme may be allowed only in the horizontal direction and restricted in the vertical direction. That is, when the current block is N×2N, the inverse transform is performed in the vertical direction of the current block, and the inverse transform may be selectively performed in the horizontal direction.

In contrast to the above example, when the current block is a non-square block having a width greater than a height, the inverse transform skip scheme may be allowed only in the horizontal direction, and when the current block is a non-square block having a height greater than a width, the inverse transform skip scheme may be allowed only in the vertical direction.

Information indicating whether or not to skip the inverse transform with respect to the horizontal direction or information indicating whether to skip the inverse transformation with respect to the vertical direction may be signaled through a bitstream. For example, the information indicating whether or not to skip the inverse transform on the horizontal direction is a 1-bit flag, 'hor_transform_skip_flag', and information indicating whether to skip the inverse transform on the vertical direction is a 1-bit flag, 'ver_transform_skip_flag'. The encoder may encode at least one of 'hor_transform_skip_flag' or 'ver_transform_skip_flag' according to the shape of the current block. Further, the decoder may determine whether or not the inverse transform on the horizontal direction or on the vertical direction is skipped by using at least one of "hor_transform_skip_flag" or "ver_transform_skip_flag".

It may be set to skip the inverse transform for any one direction of the current block depending on a partition type of the current block. For example, if the current block is generated through a binary tree-based partitioning, the inverse transform on the horizontal direction or vertical direction may be skipped. That is, if the current block is generated by binary tree-based partitioning, it may be determined that the inverse transform for the current block is skipped on at least one of a horizontal direction or a vertical direction without encoding/decoding information (e.g., transform_skip_flag, hor_transform_skip_flag, ver_transform_skip_flag) indicating whether or not the inverse transform of the current block is skipped.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:
1. A method of decoding a video, the method comprising:
   determining whether to divide a coding block into a plurality of partitions or not;
   obtaining a transform skip flag for a current block, the current block being the coding block or one of the plurality of partitions;
   determining, based on the transform skip flag, whether to skip an inverse-transform for the current block or not; and
   obtaining residual samples of the current block by skipping or performing the inverse-transform on the current block,
   wherein when the current block is one of the plurality of partitions generated by dividing the coding block, the transform skip flag for the current block is not parsed from a bitstream, and it is determined that the inverse-transform for the current block is not skipped.

2. The method of claim 1, wherein whether it is allowed to divide the coding block in a horizontal direction or in a vertical direction is determined by comparing a size of the coding block with a threshold value.

3. The method of claim 2, wherein when it is determined to divide the coding block, the coding block is divided into either 4 partitions or 2 partitions.

4. The method of claim 3, wherein the coding block is divided in only one of the horizontal direction or the vertical direction.

5. The method of claim 4, wherein the number of partitions generated by dividing the coding block is adaptively determined based on the size of the coding block.

6. A method of encoding a video, the method comprising:
   determining whether to divide a coding block into a plurality of partitions or not;
   determining whether to skip a transform for a current block or not, the current block being the coding block or one of the plurality of partitions;
   determining whether to encode a transform skip flag for the current block; and
   obtaining residual coefficients of the current block by skipping or performing the transform on the current block,
   wherein when the current block is one of the plurality of partitions generated by dividing the coding block, the transform skip flag for the current block is not encoded into a bitstream, and it is determined that the transform for the current block is not skipped.

7. A non-transitory computer readable medium having stored thereon a compressed video data, comprising:
   a data stream including residual coefficients of a current block,
   wherein the current block is representative of a coding block or one of a plurality of partitions resulting from dividing the coding block,
   wherein residual samples of the current block are generated by skipping or performing an inverse-transform for the current block,
   wherein whether to skip the inverse-transform for the current block or not is determined based on a transform skip flag of the current block,
   wherein when the current block is one of the plurality of partitions generated by dividing the coding block, the transform skip flag for the current block is not included in the data stream, and it is determined that the inverse-transform for the current block is not skipped.

* * * * *